(12) United States Patent
Mizell et al.

(10) Patent No.: US 7,006,478 B1
(45) Date of Patent: Feb. 28, 2006

(54) COMMUNICATING OVER ONE OR MORE PATHS IN AN INTERFACE BETWEEN A BASE STATION AND A SYSTEM CONTROLLER

(75) Inventors: Jerry L. Mizell, Plano, TX (US); Curtis M. Provost, Parker, TX (US)

(73) Assignee: Nortel Networks Limited, St. Laurent (CA)

( * ) Notice: Subject to any disclaimer, the term of this patent is extended or adjusted under 35 U.S.C. 154(b) by 752 days.

(21) Appl. No.: 09/715,753

(22) Filed: Nov. 17, 2000

Related U.S. Application Data

(63) Continuation-in-part of application No. 09/609,913, filed on Jul. 3, 2000.

(60) Provisional application No. 60/206,198, filed on May 22, 2000.

(51) Int. Cl.
 *H04Q 7/24* (2006.01)
(52) U.S. Cl. .................................. 370/338; 370/401
(58) Field of Classification Search ............. 370/331, 370/338, 351, 400, 401, 465
See application file for complete search history.

(56) References Cited

U.S. PATENT DOCUMENTS

| | | | |
|---|---|---|---|
| 5,278,890 A * | 1/1994 | Beeson et al. ............. 340/7.24 |
| 5,487,065 A * | 1/1996 | Acampora et al. .......... 370/331 |
| 5,815,495 A | 9/1998 | Saitoh et al. |
| 5,966,378 A | 10/1999 | Hamalainen |
| 5,974,036 A * | 10/1999 | Acharya et al. ............ 370/331 |
| 6,167,040 A | 12/2000 | Haeggstrom |
| 6,192,037 B1 * | 2/2001 | Spear ......................... 370/315 |
| 6,233,458 B1 | 5/2001 | Haumont et al. |
| 6,317,421 B1 * | 11/2001 | Wilhelmsson et al. ...... 370/328 |
| 6,320,873 B1 | 11/2001 | Nevo et al. |
| 6,339,594 B1 | 1/2002 | Civanlar et al. |
| 6,359,877 B1 | 3/2002 | Rathonyi et al. |
| 6,359,904 B1 | 3/2002 | Hamalainen et al. |
| 6,373,828 B1 * | 4/2002 | Stewart et al. .............. 370/331 |
| 6,374,117 B1 | 4/2002 | Denkert et al. |
| 6,434,140 B1 | 8/2002 | Barany |
| 6,456,627 B1 | 9/2002 | Frodigh et al. |
| 6,469,994 B1 * | 10/2002 | Ueda .......................... 370/329 |
| 6,480,476 B1 | 11/2002 | Willars |
| 6,490,259 B1 * | 12/2002 | Agrawal et al. ............ 370/331 |
| 6,505,047 B1 | 1/2003 | Palkisto |
| 6,512,756 B1 | 1/2003 | Mustajarvi et al. |
| 6,519,235 B1 | 2/2003 | Kim et al. |
| 6,553,006 B1 | 4/2003 | Kalliokulju et al. |
| 6,574,668 B1 | 6/2003 | Gubbi et al. |

(Continued)

OTHER PUBLICATIONS

"Frame Relay Service in Today's Enterprise Network Environment", AT&T Frame Relay Service, The Technology Guide Series, pp. 1-48, 1998.

(Continued)

*Primary Examiner*—Ricky Ngo
*Assistant Examiner*—Christine Ng
(74) *Attorney, Agent, or Firm*—Trop, Pruner & Hu, P.C.

(57) ABSTRACT

A mobile communications network includes base stations and a system controller, such as a serving GPRS support node (SGSN) of a General Packet Radio Service network. An interface, such as a Gb interface, is provided between each base station and the system controller. A plurality of paths (e.g., Network Service virtual circuits) in the interface are identified, with each path defined by an address in the base station and an address in the system controller. One of the plurality of paths is associated for a given mobile station. Load sharing can be accomplished by employing either an implicit path negotiation or an explicit path negotiation.

31 Claims, 19 Drawing Sheets

U.S. PATENT DOCUMENTS

| | | | |
|---|---|---|---|
| 6,584,098 B1 | 6/2003 | Dutnall | |
| 6,603,738 B1 * | 8/2003 | Kari et al. | 370/230.1 |
| 6,606,501 B1 | 8/2003 | Saha et al. | |
| 6,608,832 B1 | 8/2003 | Forslow | |
| 6,628,617 B1 | 9/2003 | Karol et al. | |
| 6,636,491 B1 | 10/2003 | Kari et al. | |
| 6,647,264 B1 | 11/2003 | Sasamoto | |
| 6,711,143 B1 * | 3/2004 | Balazinski et al. | 370/329 |
| 6,725,038 B1 | 4/2004 | Subbiah | |
| 6,728,247 B1 | 4/2004 | Meyer et al. | |
| 6,728,268 B1 | 4/2004 | Bird | |
| 6,738,379 B1 | 5/2004 | Balazinski et al. | |
| 6,751,209 B1 | 6/2004 | Hamiti et al. | |
| 2001/0033563 A1 * | 10/2001 | Niemela et al. | 370/349 |
| 2003/0039237 A1 | 2/2003 | Forslow | |

OTHER PUBLICATIONS

"Technology Overview—Frame Relay Technology", Obtained From http://www.adtran.com/tech_overview/fr_tech/index.htm, 2 Pages, Dated at Least as Early as Nov. 5, 1999.

"Voice Over Frame Relay (VOFR) Tutorial", IEEE Communications Standards Information Service, pp. 1-5, Jun. 7, 1999.

S. Masud, "Still Your Wan Workhorse" Internetweek, Techweb News, CMP Media Inc., pp. 1-8, Dec. 22, 1997.

S. Deering, et al., Network Working Group, Request for Comments 2460, "Internet Protocol, Version 6 (IPV6) Specification," Dec. 1998, pp. 1-36.

J. Postel; Request for Comments 768, "User Datagram Protocol", Aug. 28, 1980, pp. 1-3.

Information Sciences Institute, Request for Comments 791, "Internet Protocol—Darpa Internet Program, Protocol Specification," Sep. 1981, pp. 1-48.

"Digital Cellular Telecommunications System (Phase 2+); General Packet Radio Service (GPRS); Base Station System (BSS)—Servicing GPRS Support Node (SGSN); BSS GPRS Protocol (BSSGP)", ETSI TS 101 343, V7.0.0 (Jul. 1999) , European Standards Institute, pp. 1-64, 1999.

Digital Cellular Telecommunications System (Phase 2+); General Packet Radio Service (GPRS); Service Description; Stage 2 (GSM 03.60 Version 7.1.0 Release 1988) ETSI EN 301 344 V7.1.0 (Aug. 1999) , European Standards Institute, pp. 1-114, 1999.

Digital Cellular Telecommunications System (Phase 2+); General Packet Radio Service (GPRS); Base Station System (BSS)—Servicing GPRS Support Node (SGSN) Interface; Network Service (GSM 08.16 Version 7.1.0 Release 1998) TS 101 299, V6.3.0 (Jul. 1999), European Standards Institute, pp. 1-40, 1999.

* cited by examiner

| Information Element | Reference | Presence | Format | Lenght |
|---|---|---|---|---|
| PDU Type | | M | V | 1 |
| Provisioning Code | | M | V | 1 |
| Transaction ID | | M | V | 1 |
| NSEI | | C | TV | 3 |
| Number of Primary Addresses | | C | TV | 3 |
| IPv4 Addresses | | C | TV | 6-n |
| IPv6 Addresses | | C | TV | 18-n |
| UDP Port Numbers | | C | TLV | 5-n |

FIG. 5B

| Information Element | Reference | Presence | Format | Lenght |
|---|---|---|---|---|
| PDU type | | M | V | 1 |
| Transaction ID | | M | TV | 1 |
| Number of Primary Addresses | | C | TV | 3 |
| IPv4 Addresses | | C | TV | 6-n |
| IPv6 Addresses | | C | TV | 18-n |
| UDP Port Numbers | | C | TLV | 5-n |
| | | C | TLV | 4-n |

UNITDATA

| Information Element | Presence | Format | Lenght |
|---|---|---|---|
| PDU Type | M | V | 1 |
| Sequence Number | M | V | 1 |
| BVCI | M | V | 2 |
| NS-SDU | M | V | 1-? |

NS-CHANGEROUTE

| Information Element | Reference | Presence | Format | Lenght |
|---|---|---|---|---|
| PDU type | | M | V | 1 |
| TLLI | | C | TV | 5 |
| IP Address | | C | TV | 6-18 |

FIG. 16A

NS-CHANGEROUTE-ACK

| Information Element | Reference | Presence | Format | Lenght |
|---|---|---|---|---|
| PDU type | | M | V | 1 |
| TLLI | | C | TLV | 4 |
| IP Address | | C | TV | 6-18 |

FIG. 16B

COMMUNICATING OVER ONE OR MORE PATHS IN AN INTERFACE BETWEEN A BASE STATION AND A SYSTEM CONTROLLER

CROSS-REFERENCE TO RELATED APPLICATION

This application claims the benefit under 35 U.S.C. § 119(e) of U.S. Provisional Application Ser. No. 60/206,198, entitled "Internet Protocol Based Gb Interface for GPRS," filed May 22, 2000. This is a continuation-in-part of U.S. Ser. No. 09/609,913, entitled "Packet-Switched Communications in a Mobile Network," filed Jul. 3, 2000.

TECHNICAL FIELD

The invention relates generally to communications between a base station and a system controller.

BACKGROUND

Mobile communications systems, such as cellular or personal communications services (PCS) systems, are made up of a plurality of cells. Each cell provides a radio communications center in which a mobile unit establishes a call with another mobile unit or a wireline unit connected to a public switched telephone network (PSTN). Each cell includes a radio base station, with each base station connected to a mobile switching center that controls processing of calls between or among mobile units or mobile units and PSTN units.

Several protocols exist for circuit-switched wireless communications, including the advanced mobile phone system (AMPS) standard, the TIA/EIA-136 time-division multiple access (TDMA) protocol from the Telecommunications Industry Association (TIA), the Global System for Mobile (GSM) TDMA protocol from the European Telecommunications Standards Institute (ETSI), and the IS-95, IS-95A, and IS-95B code-division multiple access (CDMA) standards from the TIA.

Traditional speech-oriented wireless systems utilize circuit-switched connection paths in which a line is occupied for the duration of the connection between a mobile unit and the mobile switching center. Such a connection is optimum for communications that networks (LANs), wide area networks (WANs), and the Internet use packet-switched connections, in which communication between nodes on a communications link is performed with data packets. Each node occupies the communications link only for as long as the node needs to send or receive data packets. Such communications are bursty in nature, with packets sent in bursts followed by periods of inactivity.

A wireless connection protocol that has been proposed to provide more efficient connections between a mobile unit and a packet-switched data network such as an Internet Protocol (IP) network is the General Packet Radio Service (GPRS) protocol, with versions complementing existing GSM systems and TIA/EIA-136 systems. In a GPRS communications system, various entities are present. A serving GPRS support node (SGSN) controls communications between mobile units and a packet-based data network. The SGSN is typically connected to a gateway GPRS support node (GGSN), which provides the interface to the packet-switched data network. The SGSN is connected to base station systems (BSS) over respective Gb interfaces, which provide for the exchange of control signaling and user data.

The Gb interface link layer may be based on the Frame Relay protocol, as described in TS 101 299, entitled "Digital Cellular Telecommunications System (Phase 2+); General Packet Radio Service (GPRS); Base Station System (BSS) —Serving GPRS Support Node (SGSN) Interface; Network Service," GSM 08.16 Version 6.1.0, Release 1997 (hereinafter the "GSM 08.16 Standard"). In a Frame Relay network, permanent virtual connections (PVCs) are established between the SGSN and each base station system. A PVC is a predetermined logical path through the network between two points, in this case the SGSN and a base station system. Each PVC is associated with a data link connection identifier (DLCI), which is the identification of the PVC used by the network to find the right path and destination for a communicated frame of data. A further description of the Gb interface is provided in Draft ETSI EN 301 344, entitled "Digital Cellular Telecommunications System (Phase 2+); General Packet Radio Service (GPRS); Service Description; Stage 2," GSM 03.60 Version 7.1.0, Release 1998 (hereinafter the "GSM 03.60 Standard"); and in ETSI TS 101 343, entitled "Digital Cellular Telecommunications System (Phase 2+); General Packet Radio Service (GPRS); Base Station (BSS)—Serving GPRS Support Node (SGSN); BSS GPRS Protocol (BSSGP)," GSM 08.18 version 7.0.0 Release 1998.

Communications according to the Frame Relay protocol are connection-oriented, and differ from communications over connectionless, packet-switched networks such as IP networks. The Frame Relay protocol is relatively tightly coupled to the underlying physical layer, such as a T1 or T3 layer. This limits the flexibility in how the Gb interface can be implemented.

SUMMARY

In general, according to one embodiment, a method of establishing communications between a base station and a system controller over a network, comprises identifying a plurality of paths in the network, each path defined by an address in the base station and an address in the system controller. One of the plurality of paths is selected to communicate data associated with a given mobile station.

Some embodiments of the invention may have one or more of the following advantages. A more robust implementation of the interface between the base station and system controller is provided. For example, load sharing features may be enhanced. Also, recovery from failed paths may be made more reliable and simpler.

Other features and advantages will become apparent from the following description, from the drawings, and from the claims.

BRIEF DESCRIPTION OF THE DRAWINGS

FIGS. 5B–5C illustrate an NS-PROV message and an NS-PROV-ACK message exchanged in the message flow of FIG. 5A.

FIG. 7A illustrates a UNITDATA message containing a sequence field, the UNITDATA message for communication over the $Gb^{IP}$ interface.

FIGS. 16A–16B illustrate an NS-CHANGEROUTE message and an NS-CHANGEROUTE-ACK message used in the procedures of FIGS. 14 and 15.

DETAILED DESCRIPTION

Figure 1:
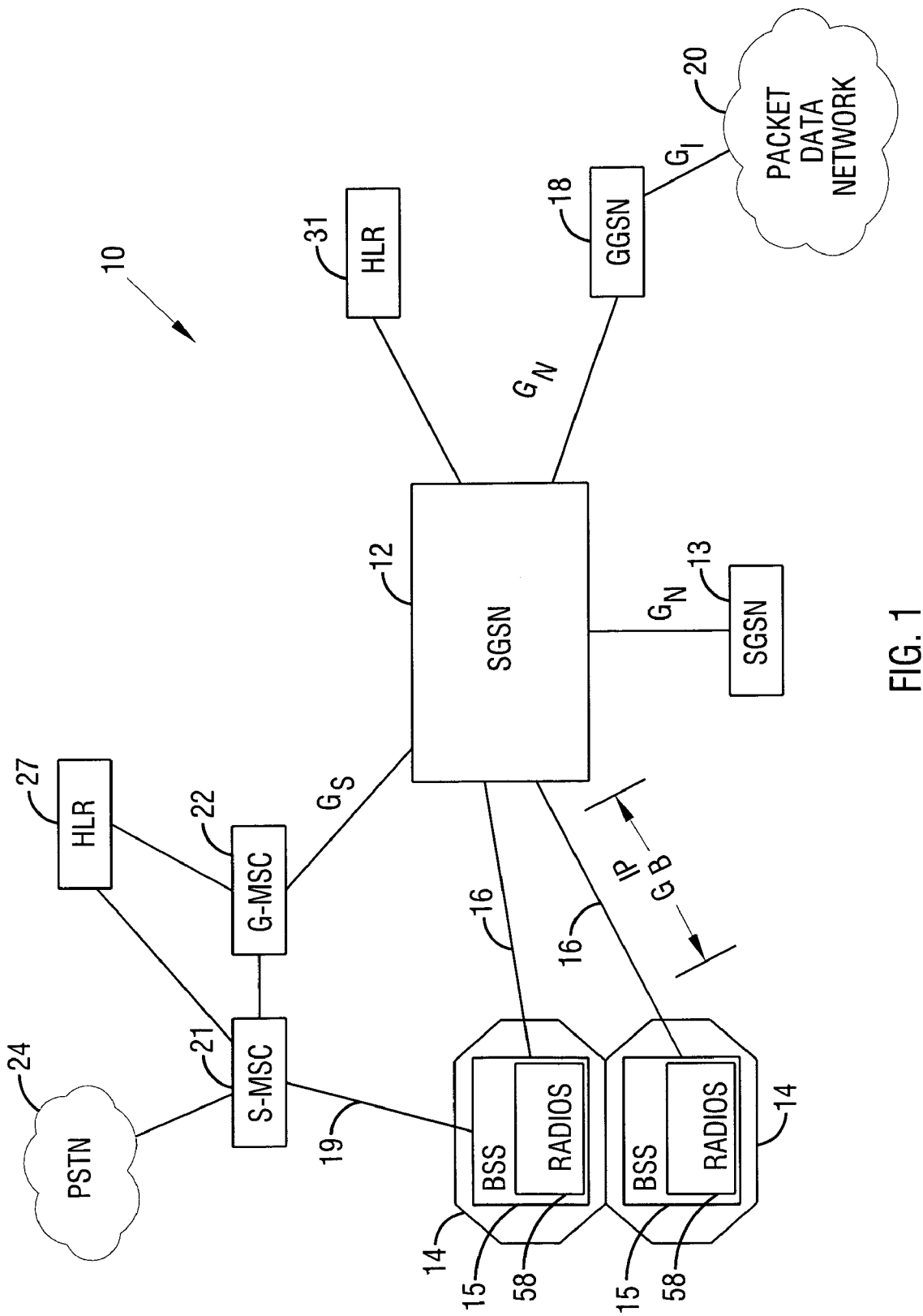
FIG. 1 is a block diagram of an embodiment of a mobile communications network.

In the following description, numerous details are set forth to provide an understanding of the present invention. However, it will be understood by those skilled in the art that the present invention may be practiced without these details and that numerous variations or modifications from the described embodiments may be possible. For example, although reference is made to Internet Protocol (IP) communications in some described embodiments, further embodiments may employ other forms of packet-switched communications. Further, although reference is made to the Gb interface between a BSS and a system controller, other types of interfaces between base stations and a system controller may be employed in further embodiments.

In some embodiments described herein, the Frame Relay protocol used for communications over the Gb interface between a base station system (BSS) and a serving GPRS support node (SGSN) in a conventional General Packet Radio Service (GPRS) system is replaced with a packet-switched, connectionless protocol. An example of such a protocol is the Internet Protocol (IP), as described in Request for Comments (RFC) 791, entitled "Internet Protocol," dated September 1981 (also referred to as IPv4). Another version of IP is IPv6, which is described in RFC 2460, entitled "Internet Protocol, Version 6 (IPv6) Specification," dated December 1998. GPRS is a standard defined by ETSI (European Telecommunications Standards Institute). A version of GPRS is described in the GSM 03.60 Standard. A Gb interface employing IP communications is referred to as a $Gb^{IP}$ interface. In further embodiments, $Gb^{IP}$ interfaces can be employed in Enhanced GPRS (EGPRS) systems and in EGPRS COMPACT systems.

Packet-switched networks, such as IP networks, communicate with packets, datagrams, or other units of data over the networks. Unlike circuit-switched networks, which provide a dedicated end-to-end connection (such as an assigned time slot of a channel) for the duration of a communications session, a packet-switched network is based on a connectionless, internetwork layer. Packets or other units of data injected into a packet-switched data network may travel independently over any network (and possibly over different networks) to a destination point. The packets may even arrive out of order. Routing of the packets is based on one or more addresses carried in each packet.

Frame Relay networks differ from both dedicated, circuit-switched networks and packet-switched networks in that they are based on a virtual connection model. The virtual connection model is connection-oriented, with frames of data according to the Frame Relay protocol sent between two endpoints over the same virtual circuit and arriving in the same order the packets were sent. Thus, even though the Frame Relay protocol is packet-based, it employs a connection-oriented model of communications that differ from packet-switched links, such as IP links, which are connectionless.

To implement a Gb interface with a packet-switched protocol, such as IP, transport and network layers are added. In addition, existing Frame Relay layers are modified to implement packet-switched services. One such layer is the Network Service (NS) layer. A main difference between the $Gb^{IP}$ and Gb interfaces is that addressing for the $Gb^{IP}$ interface is based on IP host addresses rather than virtual circuit endpoint identifiers. An NS layer that employs IP addresses for communications is referred to as an $NS^{IP}$ layer.

A further distinction is that a conventional NS layer is responsible for managing physical links between the base station system and the SGSN across the Gb interface. In contrast, the $NS^{IP}$ layer is responsible only for directing traffic to IP addresses across the $Gb^{IP}$ link. As a result, the tight coupling between the NS layer and the underlying physical layer can be removed by use of the IP or other packet-switched interface.

Referring to FIG. 1, a mobile communications network 10 includes an SGSN 12 that is coupled to base station systems (BSS) 15 at respective cell sites 14 through respective packet-switched interfaces 16. The SGSN 12 is part of a system controller for GPRS wireless services, EGPRS wireless services, or EGPRS COMPACT wireless services. The communications network 10 illustrated in FIG. 1 is a GPRS-136 or EGPRS-136 network. In another arrangement, the communications network 10 can be a GSM-GPRS or GSM-EGPRS network.

The SGSN 12 is also coupled (through a Gn interface) to a gateway GPRS support node (GGSN) 18, which is coupled through a Gi interface to a packet-based data network 20, such as an IP network. Example data networks 20 include public networks, such as the Internet, and private networks, such as local area networks (LANs) and wide area networks (WANs). The SGSN 12 may also be coupled to one or more other SGSNs 13.

In the example arrangement of FIG. 1, the SGSN 12 is also coupled to a home location register (HLR) 31, which contains a database of subscriber information used to provide control in the GPRS network. The SGSN 12 may also be coupled to a gateway mobile switching center (G-MSC) 22, which is in turn coupled to a serving MSC (S-MSC) 21. The S-MSC 21 is part of the system controller for traditional circuit-switched mobile communications. The S-MSC 21 is coupled to cell sites 14 through corresponding links 19. The S-MSC 21 is also coupled to a public switched telephone network (PSTN) 24, which is coupled to wireline units such as wireline telephones (not shown). The S-MSC 21 and G-MSC 22 can access an HLR 27 that stores subscriber information for circuit-switched services. Other arrangements of the mobile communications network 10 are possible in other embodiments.

In one embodiment, the interface 16 includes a $Gb^{IP}$ network on which IP-addressable nodes reside, including the SGSN 12 and BSS 15 in corresponding cell sites. More generally, a packet-switched interface is provided between each base station and a system controller, with one example being an SGSN. Other types of system controllers may be employed in further embodiments.

Each BSS 15 according to one embodiment may include radio modules 58 including radio transceivers to provide radio frequency (RF) signals for communicating packet-switched control signaling and traffic with mobile stations (e.g., mobile telephones, portable computers, personal digital assistants) in the respective cell site.

Figure 2:
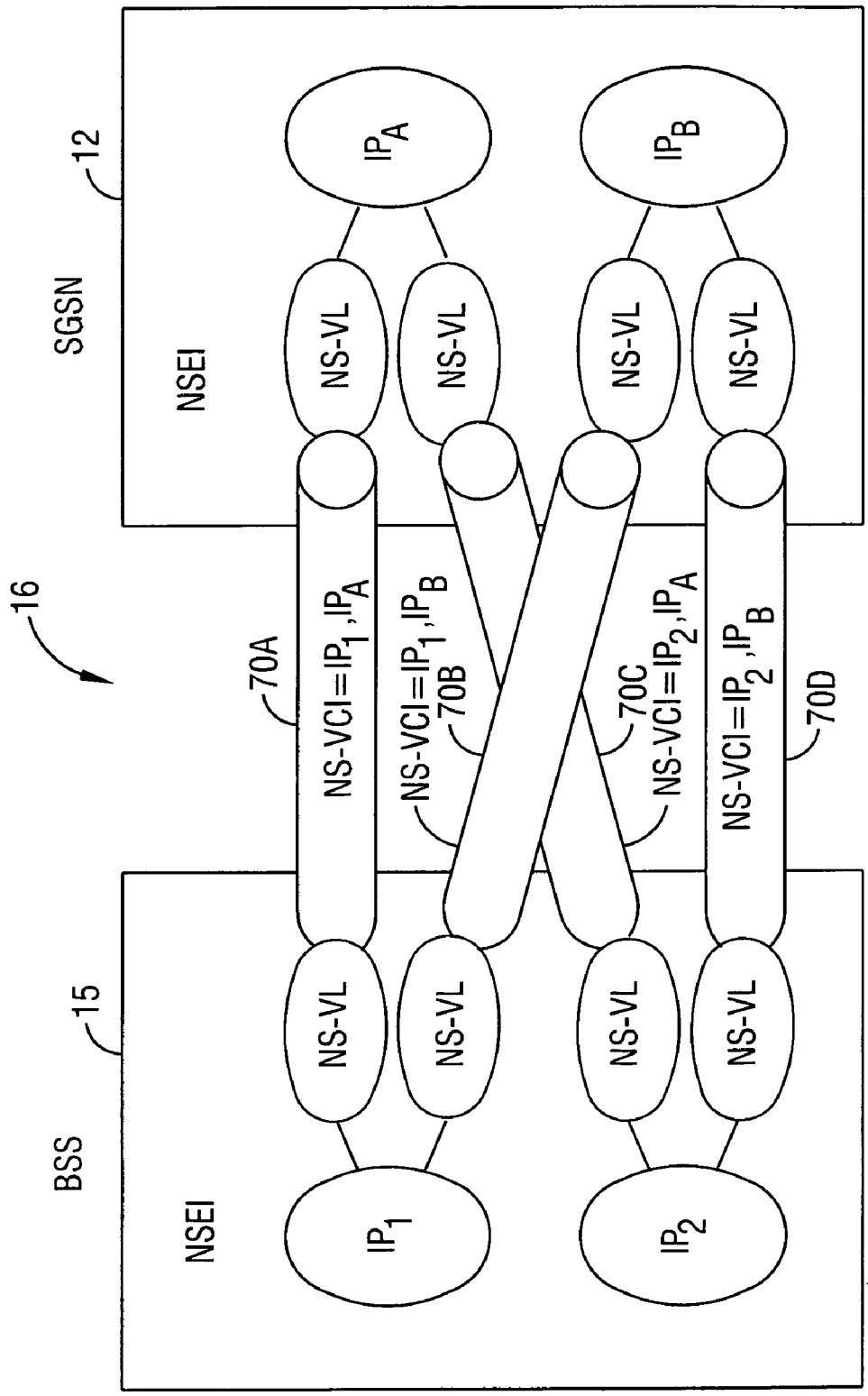
FIG. 2 illustrates an Internet Protocol (IP) address provisioning scheme for a base station system (BSS) and a serving GPRS support node (SGSN) in the mobile communications network of FIG. 1, in accordance with an embodiment.

Referring to FIG. 2, an IP addressing scheme is illustrated in the $Gb^{IP}$ network 16 that connects a BSS 15 and the SGSN 12. In provisioning the BSS 15, one or more IP addresses (e.g., $IP_1$, $IP_2$) may be assigned to the BSS 15. In provisioning the SGSN 12, one or more IP addresses (e.g., $IP_A$, $IP_B$) may be assigned to the SGSN 12. In addition, one or more Network Service entities (NSEs) in the BSS 15 and one or more NSEs in the SGSN 12 may each be assigned corresponding Network Service entity identifiers (NSEIs). The IP addresses assigned to each of the BSS 15 and the SGSN 12 are associated with respective NSEIs. In the illustrated example, it is assumed that each of the BSS 15 and SGSN 12 has one NSEI.

In the $Gb^{IP}$ interface, an NS-VC (NS virtual circuit) is defined as a "path" between two IP endpoints. However, it is noted that in a connectionless, packet-switched network (such as an IP network), a path basically comprises the network of one or more routers or other nodes that are able to route packets or messages based on IP addresses carried in the packets or messages. An NS-VC in the $Gb^{IP}$ interface is not actually a virtual circuit as that term is used in a connection-oriented network such as a Frame Relay network. Rather, NS-VC refers to a route (or plural routes) that a packet can be routed over based on source and destination addresses in the packet. As shown in FIG. 2, the NS-VCs include NS-VCs 70A, 70B, 70C, and 70D defined between four combinations of IP endpoints $IP_1$, $IP_2$, $IP_A$, and $IP_B$. Thus, the NS-VCIs (NS virtual circuit identifiers) of the virtual circuits 70A are defined in Table 1 below.

TABLE 1

| NS-VC | NS-VCI |
|---|---|
| 70A | $IP_1$, $IP_A$ |
| 70B | $IP_1$, $IP_B$ |
| 70C | $IP_2$, $IP_A$ |
| 70D | $IP_2$, $IP_B$ |

As shown in FIG. 2, a single IP address may serve multiple NS-VCs. In the illustrated example, a unique NS-VL (NS virtual link) that is based on an IP address is assigned to each NS-VC. Multiple NS-VLs may be based on the same local IP address.

An NS-VC in the $Gb^{IP}$ interface is different from the NS-VC defined for the Gb interface according to the GSM 08.16 Standard. As specified in the GSM 08.16 Standard, an NS-VC is an end-to-end virtual connection between the BSS and SGSN, which can be a physical virtual circuit (PVC) across a Frame Relay network, for example. In contrast, although referred to as an NS-VC, a virtual circuit is actually not established between the BSS and SGSN in the $Gb^{IP}$ interface. Rather, communications is based on a source IP address and destination IP address, as is the case over any general IP network. Routing of a packet over the $Gb^{IP}$ interface is based on the source and destination IP addresses. Thus, it is possible for a packet to be routed over different routes over a $Gb^{IP}$ interface, whereas frames between two endpoints on an NS-VC over the Gb interface are routed over the established virtual circuit. In the $Gb^{IP}$ interface, the term "NS-VC" is used to maintain consistency with use of "NS-VC" in the Gb interface. However, in the $Gb^{IP}$ interface, communications over the NS-VC is actually based on routing according to the source and destination addresses.

The example provided above assumes that each of the BSS 15 and SGSN 12 supports a default UDP (User Datagram Protocol) port. UDP is described in RFC 768, entitled "User Datagram Protocol," dated August 1980. Generally, UDP defines a transport layer for controlling connection between network elements over an IP network. An IP packet can include an IP header, a UDP header, and a payload. The IP header includes the source and destination IP addresses, and the UDP header includes a UDP port number. The payload contains the data that is to be communicated. In one embodiment, one UDP port (a default UDP port) is used. In other embodiments, multiple UDP ports can be defined for each of the BSS 15 and SGSN 12, in which case NS-VCs can be defined both on the IP addresses and the UDP ports.

Thus, in each of the BSS 15 and SGSN 12, "communication ports" are defined based on an IP address. In some embodiments, the "communication ports" are further defined by a UDP port.

There is no direct correlation between UDP/IP addresses and physical links. One UDP/IP address may be supported by one or more physical links, and one physical link can support one or more UDP/IP addresses.

By incorporating IP as the sub-Network Service function in the $Gb^{IP}$ interface, some characteristics of the NS-VC will no longer hold true. One characteristic is the static association between NS-VCs and Frame Relay PVCs. IP has no concept of PVCs, as applications using UDP/IP (User Datagram Protocol/Internet Protocol) normally use a client-server model, where the client knows about the server, but the server has no prior knowledge of the client.

If a client/server model is used for the $Gb^{IP}$ interface, only one side of the interface needs to be provisioned statically. Thus, unlike in the Frame Relay-based Gb interface where NS-VCs are statically provisioned on both the BSS and SGSN, dynamic provisioning of NS-VC endpoints in the $Gb^{IP}$ interface is employed in accordance with some embodiments. Since there may be a many-to-one relationship between the BSS 15 and the SGSN 12, the SGSN 12 is considered to be the server, and the BSS 15 is considered to be the client. Under this model, a mechanism can be introduced in which the BSS 15 initiates communication, and the NS-VC endpoints may be derived dynamically in a dynamic provisioning initialization procedure, which is discussed in connection with FIG. 5A below. The BSS 15 can be statically provisioned with at least one SGSN address so that communications can be initiated; however, the BSS 15 does not need to be provisioned with all of the SGSN's addresses.

Also, in accordance with some embodiments of the invention, a more robust load sharing mechanism is provided. Load sharing enables a node (the BSS or SGSN) to balance the load of user traffic messages communicated over the various paths (NS-VCs) between the BSS and the SGSN. By taking advantage of the fact that an NS-VC is defined by a base station IP address (and a UDP port) and an SGSN IP address (and a UDP port), implicit path negotiation can be performed between the base station and the SGSN. The BSS or SGSN ("the first node") controls its load by choosing an NS-VC to send user traffic. However, the remote node, which is the SGSN or BSS coupled to the other end of the $Gb^{IP}$ interface, has control of the NS-VC selection in the sense that the first node uses the IP address selected by the remote node, either by implicit or explicit path negotiation. Implicit path negotiation is performed based on the source address of the remote node during communication of user traffic. Thus, a BSS, when selecting an NS-VC, selects an NS-VC that has an SGSN IP address last used for downlink traffic (from the SGSN to the BSS). Similarly, an SGSN, when selecting an NS-VC, selects an NS-VC that has a BSS IP address last used for uplink traffic (from the BSS to the SGSN). Explicit path negotiation is performed by sending a change-route request to the remote node. Thus, there is cooperation between the BSS and the SGSN in the selection of NS-VCs for uplink and downlink traffic.

In addition to implicit and explicit path negotiations, some embodiments of the invention are able to perform "bulk" change-route requests, in which an entire set of mobiles are changed to another path. Thus, if a set of mobiles are using a first local address in a BSS or SGSN, and that first local address becomes unavailable for some reason, the bulk change-route request can shift the set of mobiles to a different local address (and thus different NS-VCs).

Figure 3:
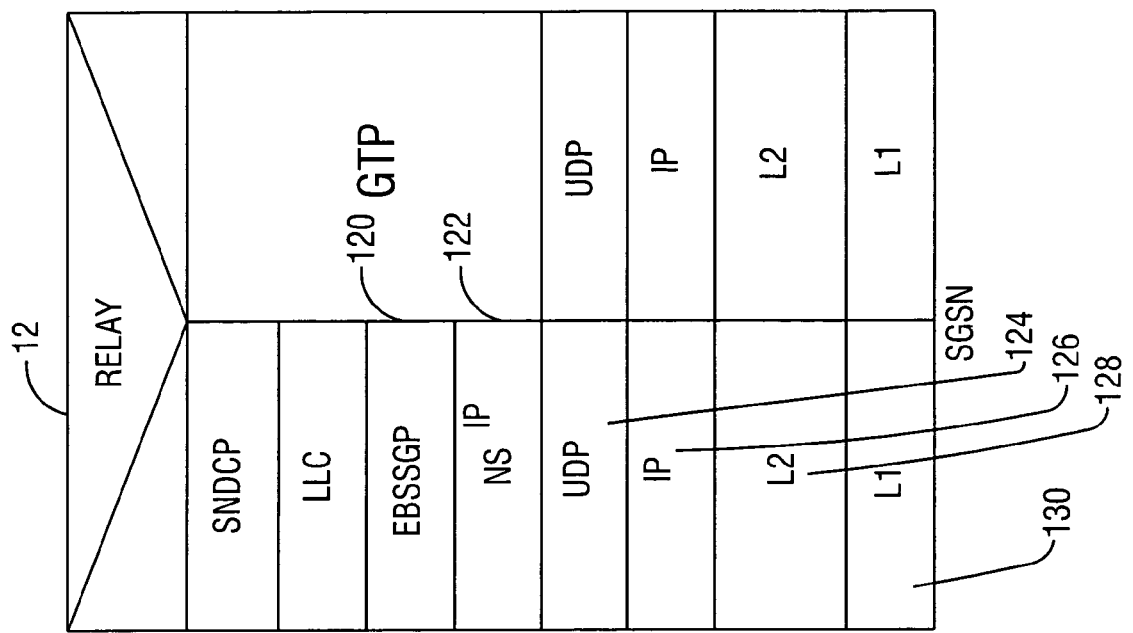
FIG. 3 illustrates interface layers in the user plane between a mobile station and the BSS and between the BSS and SGSN for an IP-based $Gb^{IP}$ interface, in accordance with an embodiment.
Figure 3:
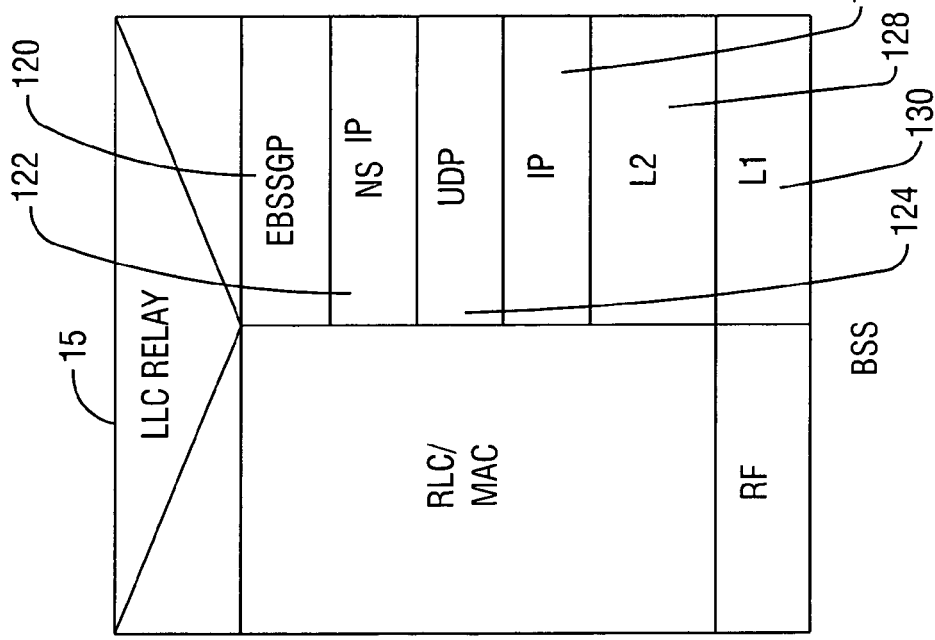
Figure 3:
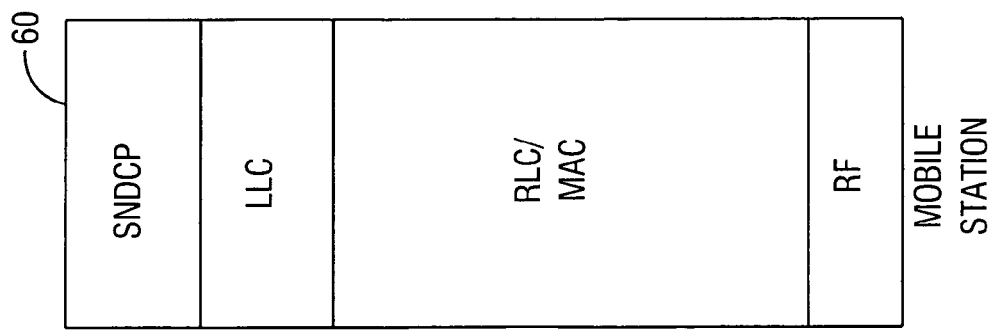
Figure 4:
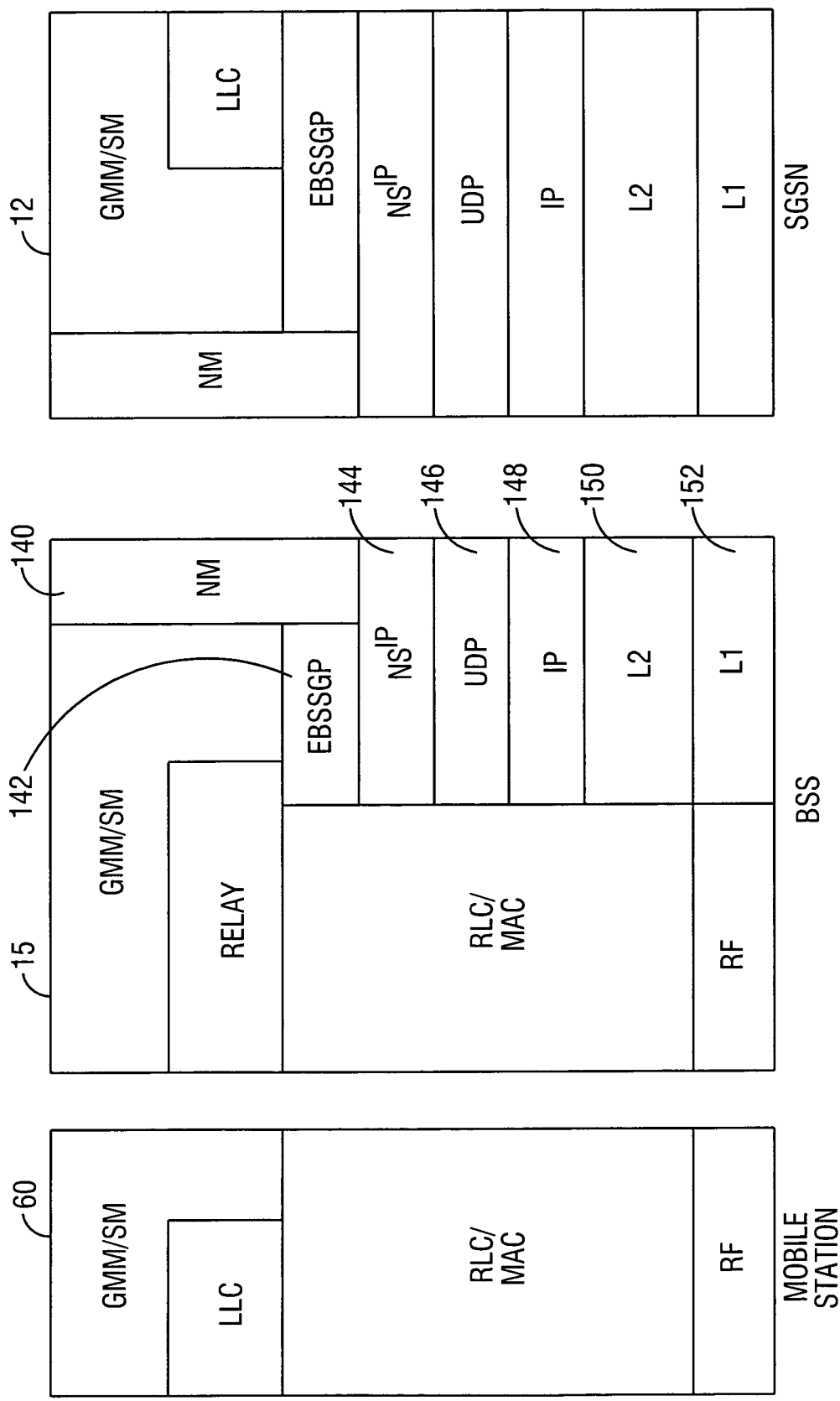
FIG. 4 illustrates control plane stack layers in an IP-based $Gb^{IP}$ interface, in accordance with an embodiment.

A discussion of the various layers of the $Gb^{IP}$ interface is provided in connection with FIGS. 3 and 4. FIG. 3 illustrates the $Gb^{IP}$ interface in the user plane (for communicating user or bearer traffic). FIG. 4 illustrates the $Gb^{IP}$ control stacks (in the control plane for communicating control signaling).

The $Gb^{IP}$ interface includes an enhanced BSSGP (base station system GPRS protocol) layer 120, an $NS^{IP}$ (Network Service) layer 122, a UDP layer 124, an IP layer 126, a level two (L2) layer 128, and a level one (L1) layer 130. The L1 layer 130 is the physical layer, and can include any number of physical circuits, such as T1 or T3 lines, wireless links, and so forth. The L2 layer 128 may include a link layer such as a point-to-point layer or a high-level data link control (HDLC) layer. UDP is a transport layer for managing connections between network elements over an IP network.

The $NS^{IP}$ layer 122 performs the transport of traffic messages, referred to as NS SDUs, between the BSS 15 and the SGSN 12. Other responsibilities of the $NS^{IP}$ layer include reporting congestion conditions and providing status indications. The primary responsibilities of the enhanced BSSGP (EBSSGP) layer 120 include the following: in the downlink path, the provision by an SGSN to a BSS of radio related information used by the RLC/MAC (radio link control/media access control) function; in the uplink path, the provision by a BSS to an SGSN of radio related information derived from the RLC/MAC function; and the provision of functionality to enable two physically distinct nodes, an SGSN and a BSS, to operate node management control functions.

In the control stack, the $Gb^{IP}$ interface similarly includes an EBSSGP layer 142, an $NS^{IP}$ layer 144, a UDP layer 146, an IP layer 148, an L2 layer 150, and an L1 layer 152, as well as a network management (NM) layer 132.

In accordance with some embodiments, to enable dynamic provisioning, a PDU (protocol data unit) type (in the $NS^{IP}$ layer) referred to as the NS-PROV PDU is defined. Generally, according to one embodiment, the BSS 15 is provisioned with, or otherwise obtains by using domain name system (DNS) techniques, at least one IP address of the SGSN 12. DNS is described in RFC 1035, entitled "Domain Names-Implementation and Specification," dated November 1987. Upon restart, the BSS discards any previously known operational information about the SGSN 12.

Each node coupled to the $Gb^{IP}$ interface is also assigned a primary IP address, which is used to communicate provisioning messages as well as certain other types of messages. Also, the primary IP address of the BSS or SGSN can be used by an originating endpoint for communicating traffic of traffic destined for, or originating from, a given mobile station if a path negotiation for traffic of the given mobile station has not yet occurred. For such messages, on the uplink, a BSS selects an NS-VC whose SGSN IP address matches an SGSN primary IP adresss; and on the downlink, an SGSN selects an NS-VC whose BSS IP address matches a BSS primary IP address.

Figure 5A:
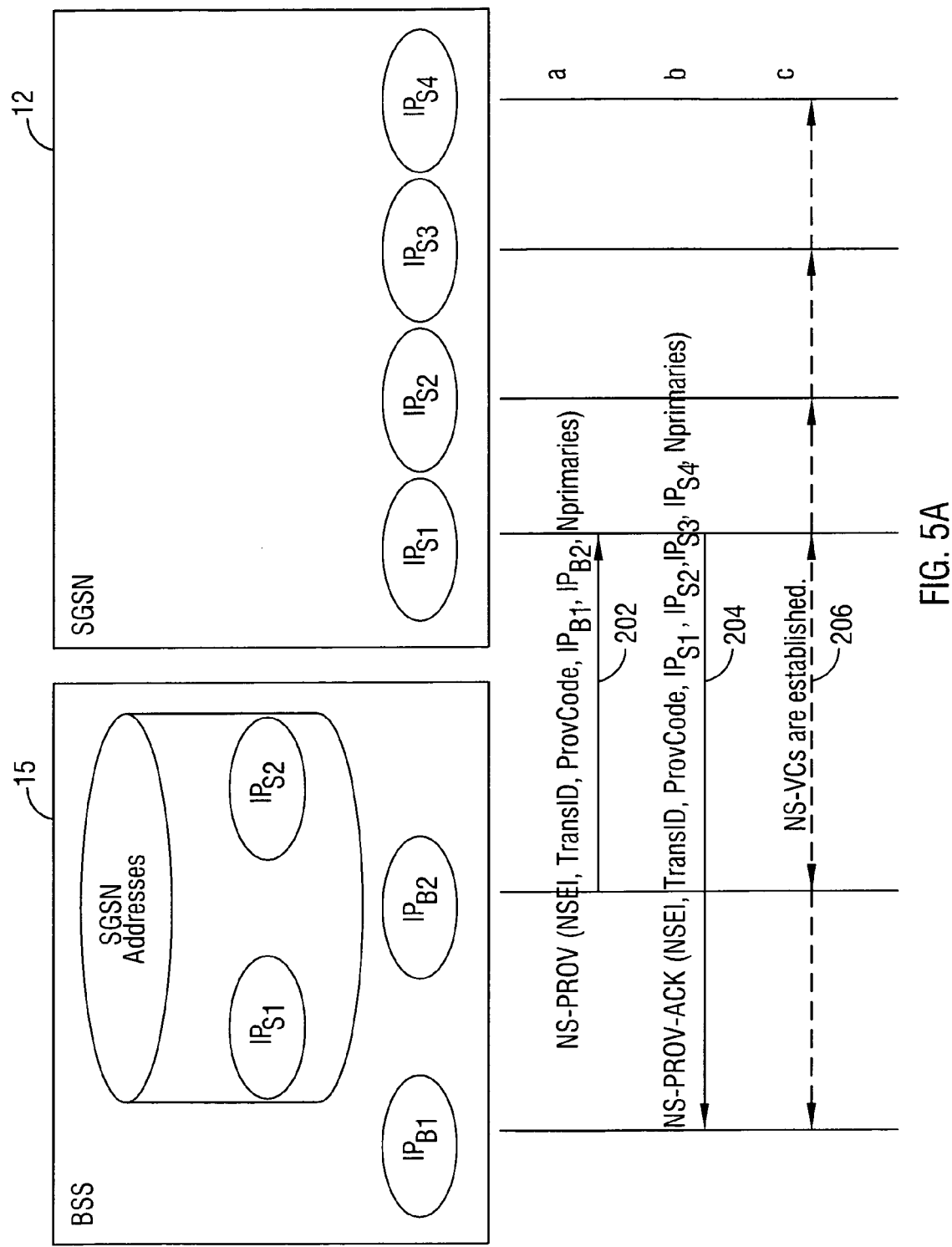
FIG. 5A is a message flow diagram of an initialization procedure over the IP-based $Gb^{IP}$ interface to perform dynamic provisioning, in accordance with an embodiment.

As shown in FIG. 5A, two SGSN IP addresses ($IP_{S1}$, $IP_{S2}$) are provisioned and stored in the BSS 15. Alternatively, the BSS 15 may be able to retrieve the SGSN IP addresses from a known location. In this example, the BSS 15 is associated with IP addresses ($IP_{B1}$, $IP_{B2}$) and a default UDP port. In other examples, plural UDP ports may be associated with the BSS 15. An initialization procedure is initiated by the BSS 15 to establish or restore connectivity to the SGSN 12. During initialization, UDP and IP information are exchanged between the BSS 15 and SGSN 12.

To begin initialization, the BSS 15 sends an NS-PROV message (at 202) to one of the SGSN IP addresses and to the default UDP port of the SGSN 12. As shown in FIG. 5B, an NS-PROV message 220 contains the following information elements: a PDU Type field 222 (to identify the message as being an NS-PROV message); a ProvCode field 224, which is the provisioning code to identify the function being requested by the provisioning message (in this case initialization); a TransID field 226, which is the transaction ID that identifies the provisioning message; an NSEI (NS entity identifier) field 228, which identifies the NSE within the BSS 15; a field 232 containing one or more IPv4 addresses associated with the BSS 15 ($IP_{B1}$ and $IP_{B2}$ in the illustrated example); a field 234 containing one or more IPv6 addresses associated with the BSS 15; an Nprimaries field 230 to indicate the number of IP addresses to be considered primary addresses (the first Nprimaries addresses in the list are primary addresses); and a UDP Port field 236 to identify the one or more UDP ports associated with the BSS 15.

Generally, the SGSN 12 can accept an initialization message at any address. If the SGSN 12 determines that the NS-PROV PDU is semantically correct, and that all IP addresses and other information elements are not in error, then the SGSN 12 recognizes the provisioning code as initialization. It then clears all prior record of the specified NSE in the BSS 15.

The SGSN 12 then responds (at 204) with an NS-PROV-ACK message, which is shown in FIG. 5C. The NS-PROV- ACK message 240 contains a PDU Type field 242; a transaction ID (TransID) field 244 from the NS-PROV PDU; an Nprimaries field 246 to indicate the number of primary addresses in the NS-PROV-ACK message 240; a field 248 containing one or more IPv4 addresses provisioned in the SGSN 12 (e.g., $IP_{S1}$, $IP_{S2}$, $IP_{S3}$, $IP_{S4}$); a field 250 containing IPv6 addresses of the SGSN 12; and a UDP port field 252 containing the one or more UDP ports of the SGSN 12. Other fields may also be contained in the NS-PROV-ACK message 240 and in the NS-PROV message 220.

At this point, since the IP addresses of the SGSN 12 have been dynamically provisioned in the BSS 15, and the IP addresses of the BSS 15 have been dynamically provisioned in the SGSN 12, the NS-VCs between each pair of IP addresses can be established (at 206). It is assumed that, in the normal case, all IP addresses conveyed between the SGSN 12 and the BSS 15 are operational and accessible.

Figure 6:
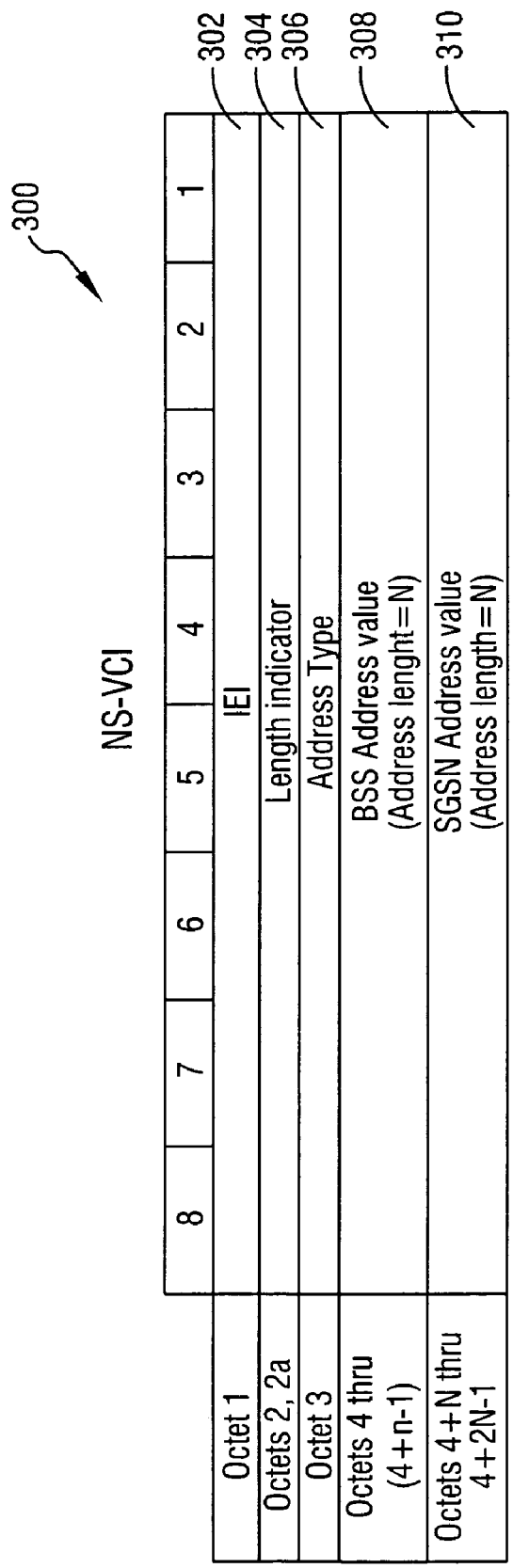
FIG. 6 illustrates a virtual circuit identifier for identifying a virtual circuit in the $Gb^{IP}$ interface.

Referring to FIG. 6, according to one embodiment, to enable dynamic provisioning, the NS-VCI structure (300) of a $Gb^{IP}$ interface has been modified with respect to the NS-VCI structure of a Frame Relay Gb interface. The NS-VCI 300 contains various fields, including an IEI (information element identifier) field 302, a length indicator field 304 to indicate the length of the NS-VCI 300, an address type field 306 to indicate the address type (e.g., IPv4 or IPv6), the BSS address value 308, and the SGSN address value 310. The address values 308 and 310 can specify just IP addresses (with a default UDP port assumed), or the address values 308 and 310 can specify both UDP ports and IP addresses. The NS-VCI 300 is based on the pair of address values 308 and 310 to identify an NS-VC.

After IP addresses (and UDP ports) have been dynamically provisioned in each of the BSS 15 and SGSN 12, the following are the steady state operations for the $Gb^{IP}$ interface. For each mobile station that it is currently serving, the BSS 15 has an association between the mobile station and the SGSN IP address that is serving the mobile station. Similarly, the SGSN 12 has an association between the mobile station and the BSS address serving the mobile station. The mobile station may be identified based on its TLLI (temporary logical link identifier).

For a given mobile station, if no path negotiation between the BSS 15 and SGSN 12 has taken place, user traffic is directed to the primary IP address of the peer NSE (the BSS or SGSN, depending on the direction of communication). The BSS 15 sends uplink messages to an SGSN IP address only if the address is active according to the most recent provisioning message. If the negotiated IP address becomes inactive, then subsequent uplink PDUs are directed to the SGSN's primary IP address until the path is renegotiated. Similarly, the SGSN 12 sends downlink messages to a BSS IP address only if the address is active according to the most recent provisioning message. If the negotiated IP address becomes inactive, then subsequent downlink PDUs are directed to the primary IP address of the BSS until the path is renegotiated.

In the $Gb^{IP}$ interface, UNITDATA PDUs are used to carry NS SDUs (user traffic) between the BSS 15 and the SGSN 12. As shown in FIG. 7A, an UNITDATA PDU 340 includes a PDU Type field 342 to identify the type of the PDU (in this example UNITDATA), a Sequence Number field 344, a BVCI (BSSGP virtual connection identifier) field 346, and the NS SDU 348. Since messages routed over the $Gb^{IP}$ interface are more likely to be received out of order than messages routed over a Frame Relay Gb interface, an out-of-order delivery mechanism is implemented in the $Gb^{IP}$ interface. In one embodiment, as illustrated in FIG. 7A, the out-of-order delivery mechanism is the addition of the Sequence Number field 344 in the UNITDATA PDU 340, a field that is not present in the UNITDATA PDU of the Frame Relay Gb interface.

The Sequence Number field 344 can be added in place of a spare field that is not used in the Frame Relay Gb interface UNITDATA PDU. In one arrangement, the Sequence Number field 342 is incremented with each transmission of the UNITDATA PDU. For example, the incrementing can be mod 256 (the sequence number wraps back to zero upon reaching 256) for each NS SDU sent on the same NS-VC. At the receiving end, the Sequence Number field 344 can be used to determine the order of UNITDATA PDUs, thereby ensuring that an in-order delivery of the PDUs is accomplished.

Figure 7B:
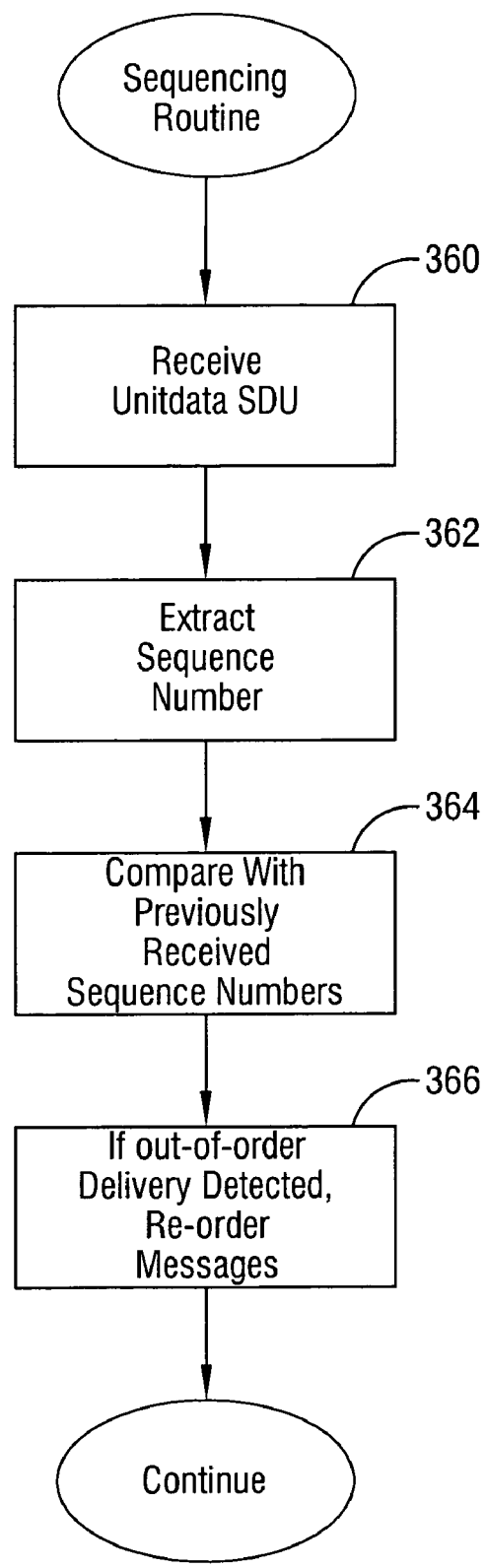
FIG. 7B is a flow diagram of a process of determining out-of-order delivery of messages.

In FIG. 7B, one example process for detecting for determining if out-of-order delivery has occurred is shown. The process can be performed by a sequencing routine that may be part of the $NS^{IP}$ layer. The sequencing routine can also be implemented in other layers of the Gb interface.

The sequencing routine receives (at 360) a UNITDATA PDU, which contains a Sequence Number field 344 as shown in FIG. 7A. The sequencing routine then extracts (at 362) the value of the sequence number from the UNITDATA PDU. The sequencing routine then compares (at 364) the extracted sequence number with previously received sequence numbers to determine if an out-of-order delivery has occurred. For example, a PDU with a first sequence number value may be expected, but the received PDU may contain a sequence number that skips over one or more numbers. If that occurs, the received PDU may be held in a queue or buffer by the sequencing routine until one or more other PDUs with the expected sequence number(s) are received, at which time the PDUs can be re-ordered (at 366).

Figure 8:
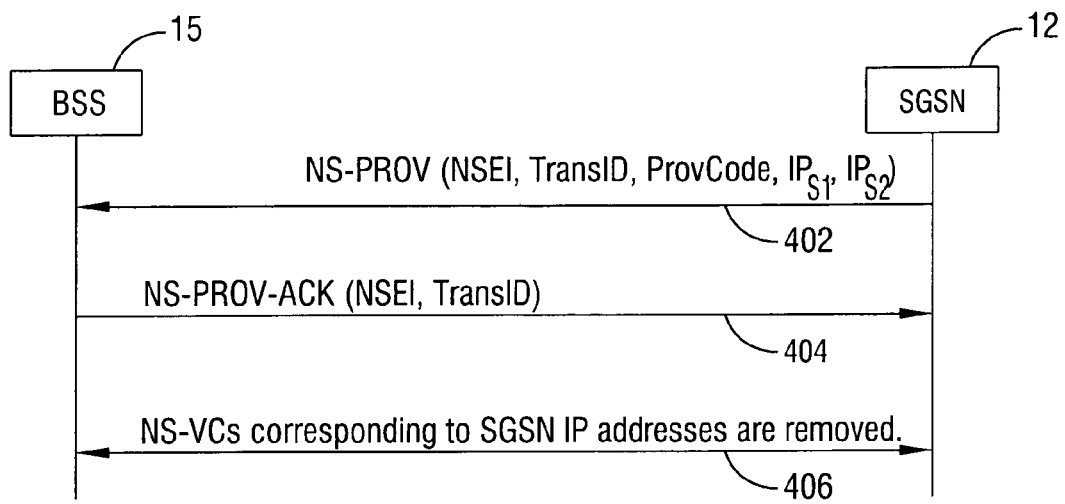
FIG. 8 is a message flow diagram illustrating a procedure to decommission Internet Protocol (IP) addresses in the SGSN.

After IP addresses have been provisioned in each of the BSS 15 and SGSN 12, some embodiments of the invention allow IP addresses (and/or UDP ports) be taken out of service (e.g., such as due to failure or as part of an administrative action). FIG. 8 shows the decommissioning of a non-primary IP address of the SGSN 12. The SGSN 12 sends an NS-PROV message (at 402), which is directed at a primary address of the BSS 15. The following information elements are contained in the NS-PROV message: NSEI; TransID; ProvCode (set to a value to indicate decommissioning of an address); and the SGSN IP address list, which contains IP addresses to be decommissioned (e.g., $IP_{S1}$, $IP_{S2}$). The BSS 15 responds (at 404) with an NS-PROV-ACK message to acknowledge the NS-PROV message from the SGSN 12. To ensure that the appropriate NS-PROV message is being acknowledged, the NS-PROV-ACK message contains the TransID field of the NS-PROV message. At this point, both the BSS 15 and SGSN 12 removes (at 406) NS-VCs having an endpoint at any of the decommissioned IP addresses. A UDP port may be decommissioned in a similar manner.

The procedure described in connection with FIG. 8 is performed between the SGSN 12 and all other BSS 15 that are coupled to the SGSN 12. For any given mobile station, if the SGSN IP address for uplink traffic has been decommissioned, then the BSS 15 directs subsequent uplink PDUs to the primary SGSN IP address until the SGSN 12 reinitiates path negotiation using a downlink PDU or a change-route message (described below).

Figure 9:
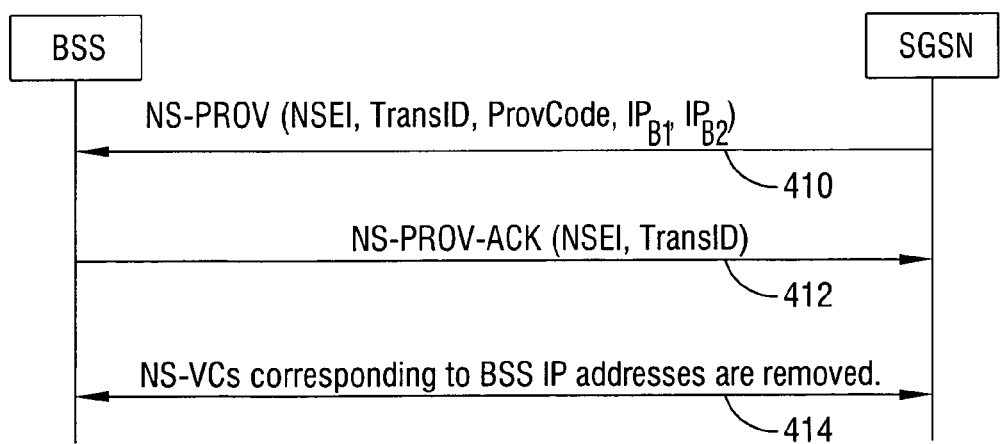
FIG. 9 is a message flow diagram illustrating a procedure to decommission IP addresses in the BSS.

FIG. 9 describes the decommissioning of a non-primary IP address of a BSS 15. The BSS 15 sends an NS-PROV message (at 410) to the SGSN 12, with the NS-PROV message containing the NSEI field, the TransID field; the ProvCode field (set to a value representing decommissioning), and a BSS IP address list (containing the IP addresses to be decommissioned). Upon receipt of the NS-PROV message, the SGSN 12 responds (at 412) with the NS-PROV-ACK message that contains the same TransID field as the NS-PROV message. At this point, the NS-VCs having an endpoint at any of the decommissioned IP addresses are removed (at 414) from service by both the SGSN 12 and the BSS 15. A UDP port may be decommissioned in a similar manner. For any given mobile station, if a BSS IP address (or UDP port) for downlink traffic is decommissioned, then the SGSN 12 sends subsequent downlink PDUs to the primary BSS address until the BSS initiates path negotiation on an uplink PDU or a change-route message. Path negotiation may be performed before or after decommissioning the address.

The BSS 15 and SGSN 12 may each commission additional IP addresses (and/or UDP ports) using similar mechanisms as for decommissioning IP addresses (and/or UDP ports). Commissioning is also performed using the NS-PROV message, except that the ProvCode field is set to a value representing commissioning rather than decommissioning. The node receiving the NS-PROV message will also return an NS-PROV-ACK message with the same TransID value as in the NS-PROV message. When one or more addresses (and/or UDP ports) are commissioned, the NS-VCs between each of the added addresses (and/or UDP ports) and each of the existing IP addresses (and/or UDP ports) at the peer NSE are added.

In one embodiment, an NS-VC management module in the $NS^{IP}$ layer controls the following tasks: initialization, address commissioning and decommissioning, primary address notification or replacement (described below), testing of communications paths, and performing load sharing tasks (described below). In other embodiments, other layers in the Gb interface may control the listed tasks, such as the NM layer 140 (FIG. 4).

In addition to the commissioning and decommissioning of non-primary IP addresses, the primary IP address may be modified for various reasons, such as due to failure of a primary IP address or because of some administrative action. If a primary address fails, another IP address, if available, is assigned as the primary address. If no other IP address that can be used as a primary address is commissioned, then the node is considered failed. If the failure is on the SGSN 12, then the SGSN 12 clears all information regarding all BSS 15 who view that address as a primary IP address. If the failure is on the BSS 15, then the BSS initiates the initialization procedures, as discussed in connection with FIG. 5A.

Figure 10:
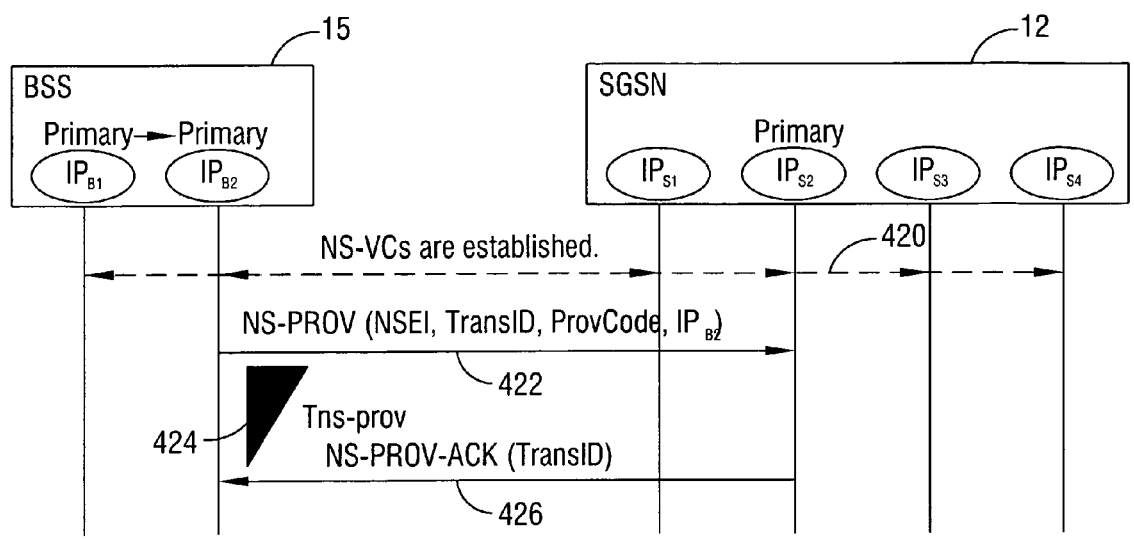
FIG. 10 is a message flow diagram illustrating replacement of a primary address.

FIG. 10 shows a procedure for performing primary address replacement in the BSS 15. In the example of FIG. 10, it is desired to change the primary address from $IP_{B1}$ to $IP_{B2}$. The initialization procedure has already taken place, with $IP_{B1}$ being the primary address of the BSS and $IP_{S2}$ being the primary address of the SGSN. NS-VCs are also established (at 420). To change the primary address, the BSS 15 sends an NS-PROV message to the SGSN 12, with the NS-PROV message containing the NSEI field, TransID field, ProvCode field (set to a value representing primary address notification), and the new primary address (e.g., $IP_{B2}$). The NS-PROV message is sent from the source address $IP_{B2}$.

The BSS 15 then starts (at 424) a timer Tns-prov to provide a timeout in case the SGSN 12 does not respond to the primary replacement NS-PROV message within a predetermined period of time. At this point, after having sent the NS-PROV message and before receiving an acknowledge from the SGSN 12, the BSS 15 accepts provisioning and signaling messages on both the old and new primary addresses. Upon receiving the NS-PROV message, the SGSN 12 marks as non-primary all IP addresses previously marked as primary. Also, it stores the one or more addresses that were indicated as being primary in the NS-PROV message. The SGSN 12 returns the NS-PROV-ACK message (at 426). After receiving the NS-PROV-ACK message, the BSS 15 considers the primary address to be replaced, and the old primary address is no longer considered a primary address.

If the timer Tns-Prov expires without receiving an NS-PROV-ACK message, the BSS 15 attempts the NS-PROV primary replacement procedure a predetermined number of times before the procedure is considered failed. A similar procedure can be performed to replace a primary address in the SGSN 12. Instead of the NS-PROV message initiated by the BSS 15, the SGSN 12 initiates transmission of the NS-PROV message.

If a new IP address is to be commissioned, and it is to be become the primary address, then the new IP address is commissioned as a non-primary address. After being commissioned as a non-primary address, the primary address notification procedure discussed above can be used to replace the primary IP address.

A robust mechanism is provided to enable communications over an interface between a base station and a system controller, in which dynamic provisioning of NS-VCs is made possible by defining each NS-VC as a combination of two IP endpoints. During initialization, the IP addresses of each node on the interface is communicated to the other node, at which point NS-VCs can be established. During operation, IP addresses can be decommissioned in each node to remove NS-VCs from service, and new IP addresses can be commissioned in each node to add new NS-VCs.

In accordance with some embodiments of the invention, both the BSS 15 and SGSN 12 are able to control the load of both uplink and downlink traffic over the $Gb^{IP}$ interface. Load sharing enables a node (the BSS or SGSN) to balance the load of user traffic messages communicated over the various paths (NS-VCs) between the BSS and the SGSN. In the $Gb^{IP}$ interface, each of the BSS 15 and the SGSN 12 is able to control traffic load on the uplink and downlink paths. Thus, each NSE (in the BSS or SGSN) can determine both the local and remote IP addresses associated with UNIT-DATA PDUs associated with a given mobile station. This is unlike load sharing in a Frame Relay Gb interface, where the load sharing functions of the BSS and SGSN are independent. In the Gb interface, the BSS 15 controls load sharing for uplink traffic, while the SGSN 12 controls load sharing for downlink traffic—neither node controls load sharing for incoming traffic.

Figure 11:
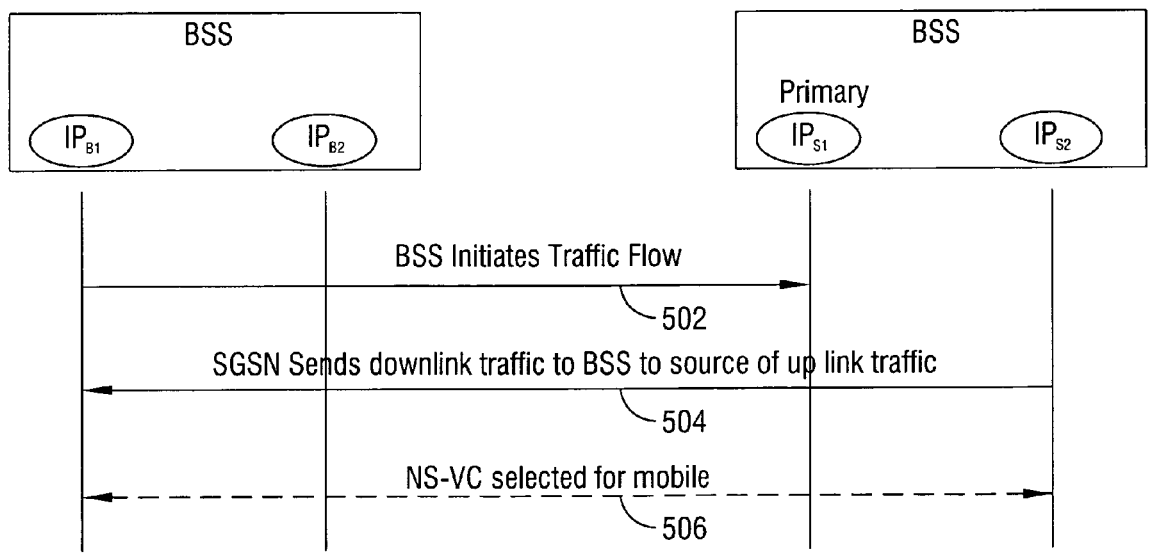
FIG. 11 is a message flow diagram illustrating an implicit path negotiation procedure.

FIG. 11 shows an initial path setup between the BSS 15 and the SGSN 12 in which an implicit path negotiation is performed between the BSS 15 and SGSN 12 for establishing the traffic path for a mobile station when a unidirectional flow from the mobile station occurs. In the example, the IP addresses provisioned in the BSS 15 are $IP_{B1}$ and $IP_{B2}$, while the IP addresses provisioned in the SGSN 12 are $IP_{S1}$ and $IP_{S2}$, with $IP_{S1}$ being the primary IP address of the SGSN 12. The BSS 15 initiates traffic flow (at 502) to the SGSN 12. The load sharing task on BSS 15 determines which local IP address ($IP_{B1}$ in this example) to use for serving the traffic of the mobile station (MS A). MS A can be identified using its TLLI. Since no negotiation has taken place at this point, the BSS 15 sends the uplink traffic to the primary IP address ($IP_{S1}$) of the SGSN 12.

After receiving the mobile traffic from the BSS 15, the SGSN 12 selects a local IP address (e.g., $IP_{S2}$) on which the traffic of the mobile station (MS A) is to be served. The SGSN 12 then sends (at 504) downlink traffic from the selected IP address (that is, $IP_{S2}$ is designated as the source IP address from the SGSN 12). The load sharing task (located in the $NS^{IP}$ layer 122) on the BSS 15 recognizes that traffic for the mobile station (MS A) is coming from $IP_{S2}$. As a result, the NS-VC for the mobile station (MS A) is selected (at 506) implicitly, and the BSS 15 directs subsequent uplink traffic for the same mobile station (MS A) from the source address $IP_{B1}$ to the destination address $IP_{S2}$. The negotiation is implicit in the sense that an explicit control message is not needed to identify an NS-VC for traffic of a given mobile station. Instead, the communication of traffic itself (uplink and downlink) enables the negotiation of the NS-VC.

Figure 12:
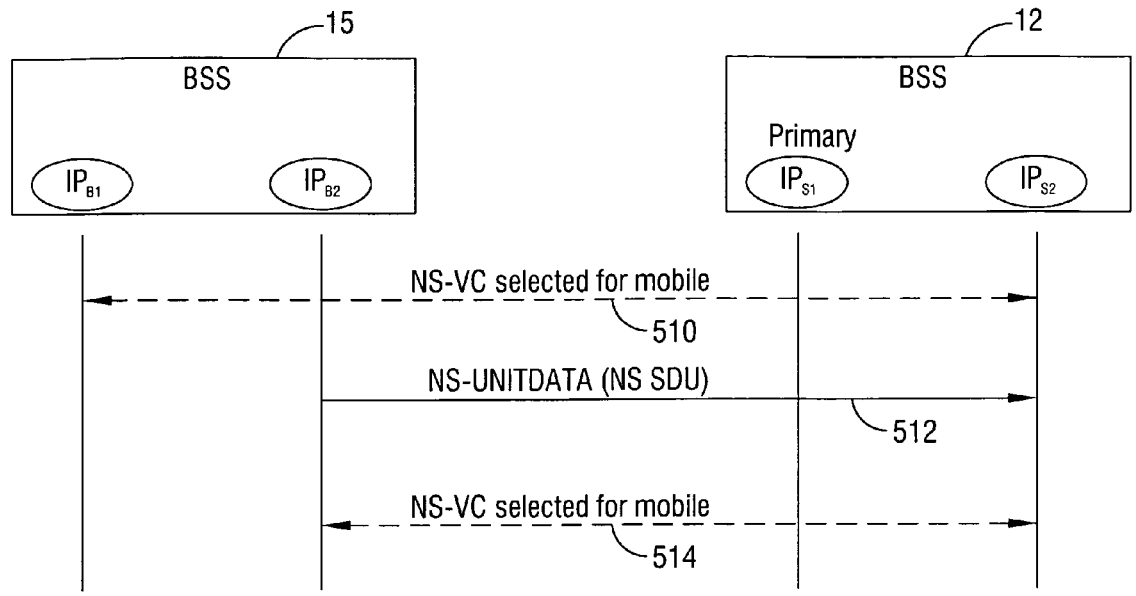
FIG. 12 is a message flow diagram illustrating an implicit path negotiation after an initial path has been set up.

Implicit negotiation can also occur after path negotiation has already taken place for the traffic of the mobile station (MS A). FIG. 12 shows a negotiation initiated by the BSS 15; however, either the BSS 15 or the SGSN 12 may initiate negotiation. As shown in FIG. 12, the path negotiation between the BSS 15 and the SGSN 12 for a given mobile station (MS A) has already taken place, and thus an NS-VC has been selected (at 510) for MS A. The selected NS-VC is ($IP_{B1}$, $IP_{S2}$). If the BSS 15 wishes to serve the mobile station on an alternate IP address (e.g., $IPB_2$), then the BSS 15 sends (at 512) subsequent uplink NS-UNITDATA PDUs to the negotiated SGSN IP address $IP_{S2}$, using the alternate address $IP_{B2}$ as the source address. Upon receipt, the SGSN 12 determines that the source IP address for the traffic associated with the mobile station (MS A) has changed. Both the BSS 15 and the SGSN 12 establishes (at 514) a new NS-VC, based on $IP_{B2}$ and $IP_{S2}$. Subsequent downlink traffic for the mobile station (MS A) is communicated over the new NS-VC.

Between the acts of 512 and 514, the SGSN 12 may still be directing downlink packets to the old IP address $IP_{B1}$ in the BSS 15. In this case, actions are taken by the BSS 15 to ensure correct processing of such packets.

Implicit path negotiation as discussed above is possible when traffic between the BSS 15 and the SGSN 12 is bidirectional, which is often the case with speech traffic. However, certain other types of traffic are generally unidirectional in nature, making implicit negotiation difficult or unreliable. As an alternative to implicit path negotiation, explicit path negotiation can also be performed in accordance with some embodiments of the invention. To do so, an NS-CHANGEROUTE PDU or message is defined for use by either the SGSN 12 or the BSS 15 to explicitly negotiate the NS-VC for a particular mobile station or for all mobile stations being served by a single IP address. The NS-CHANGEROUTE message may be sent at any time by the SGSN 12 or BSS 15 to more effectively share processor or input/output (I/O) bandwidth between mobile stations.

Figure 13:
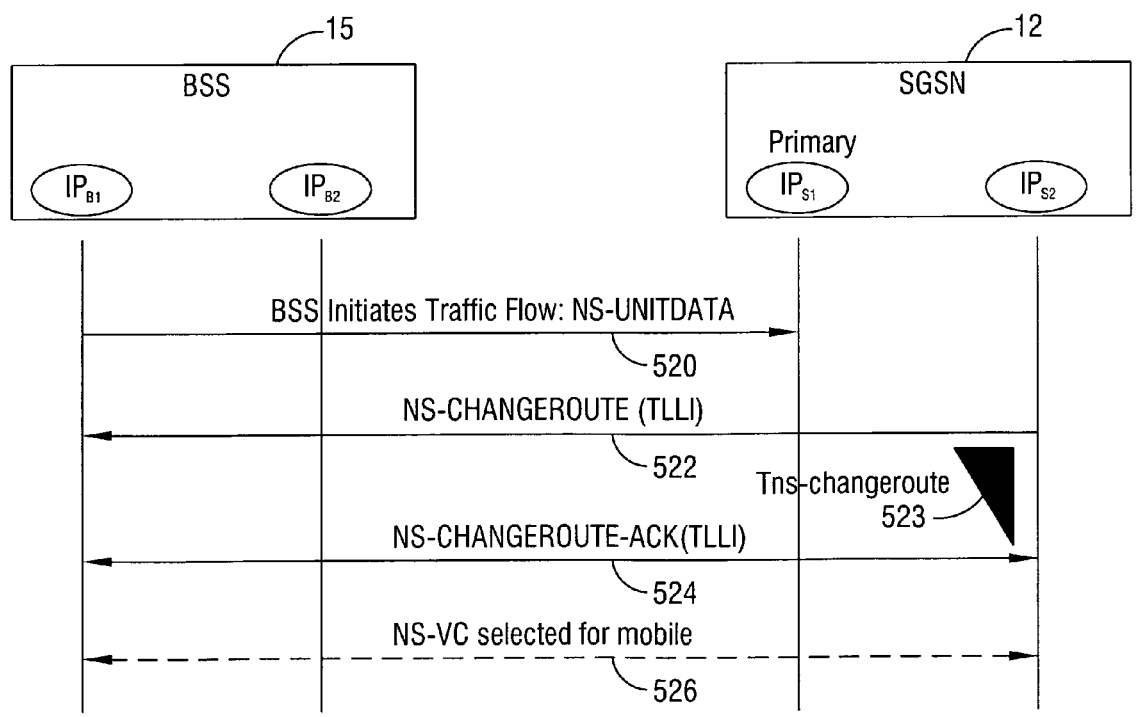
FIG. 13 is a message flow diagram illustrating an explicit path negotiation procedure.

FIG. 13 illustrates an example message flow for explicit path negotiation between the BSS 15 and the SGSN 12, which is triggered by detection of a unidirectional flow of traffic from the mobile station (MS A). The BSS 15 initiates traffic flow (at 520), with the source address being $IP_{B1}$ and the destination address being $IP_{S1}$. Since negotiation has not taken place yet at this point, the BSS 15 sends (at 522) uplink traffic to the primary IP address ($IP_{S1}$) of the SGSN 12. The load sharing task on the SGSN 12 selects a local IP address (e.g., $IP_{S2}$) on which the traffic of the mobile station (MS A) is to be served. The SGSN 12 has no downlink traffic to send to the BSS 15 (since the traffic flow is unidirectional in the uplink path); as a result, the SGSN 12 sends an NS-CHANGEROUTE PDU that contains the TLLI of the mobile station (MS A) to the BSS 15. The SGSN 12 starts (at 523) a timer Tns-changeroute to wait for an acknowledge message from the BSS 15. If the $NS^{IP}$ layer in the BSS 15 successfully receives the NS-CHANGEROUTE message, it sends an NS-CHANGEROUTE-ACK message (at 524) containing the same TLLI value (associated with MS A) back to the SGSN 12, with the source address being $IP_{B1}$ and the destination address being $IP_{S2}$.

The $NS^{IP}$ layer also notifies the load sharing task of the explicit path renegotiation. The load sharing task on the BSS 15 recognizes the TLLI of the mobile station (MS A) and associates the source IP address of the SGSN 12 ($IP_{S2}$) of the PDU with the mobile station (MS A). The NS-VC is then selected (at 526) for the mobile station (MS A) and all subsequent uplink traffic for the mobile station (MS A) is directed by the $NS^{IP}$ layer to the destination address $IPS_2$ in the SGSN 12.

Figure 14:
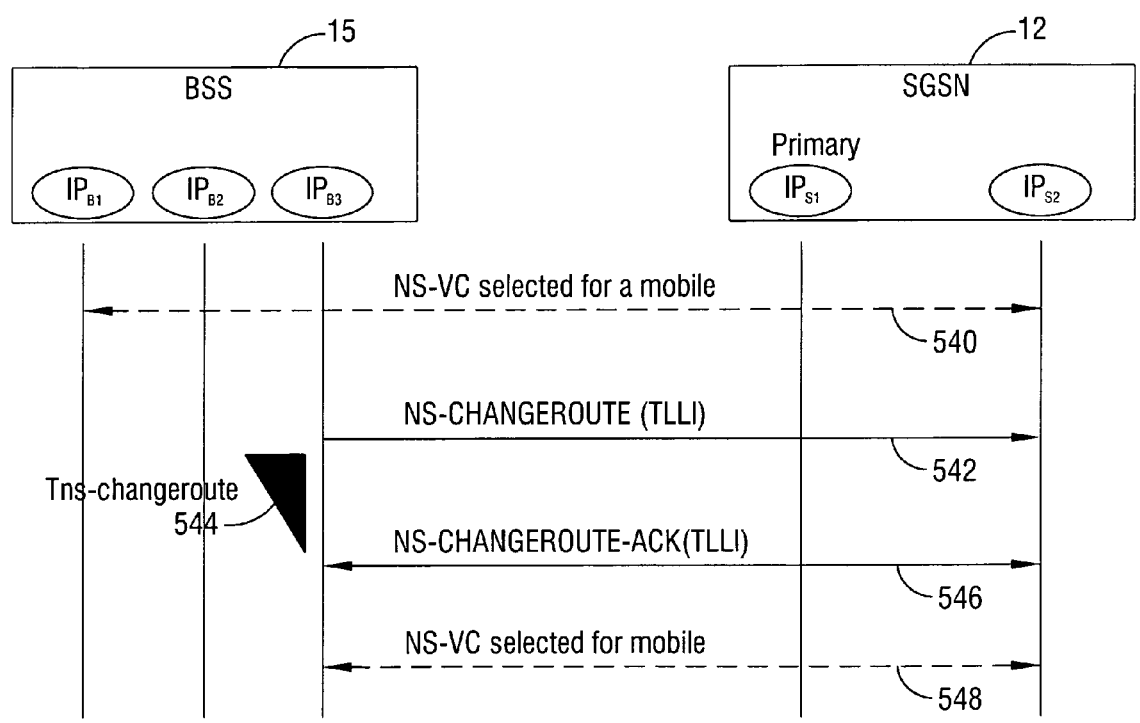
FIG. 14 is a message flow diagram illustrating an explicit path negotiation procedure after a path has been set up.

After initial path negotiation has taken place and a path has been established, an explicit path negotiation can also subsequently be performed to change the path. FIG. 14 shows such a procedure. The NS-VC for the given mobile station (MS A) has been negotiated (at 540) between the BSS 15 and the SGSN 12. In this example, the traffic of the mobile station (MS A) is served on NS-VC ($IP_{B1}$, $IP_{S2}$). If the load sharing task on the BSS 15 decides to serve the mobile station (MS A) on $IP_{B3}$ rather than $IP_{B1}$, the $NS^{IP}$ layer in the BSS 15 sends (at 542) an NS-CHANGEROUTE PDU containing the TLLI of the mobile station (MS A) to the SGSN 12. The NS-CHANGEROUTE message is sent from the source address $IP_{B3}$. After sending the NS-CHANGEROUTE message, the BSS 15 also starts (at 544) a timer Tns-changeroute to wait for an acknowledge from the SGSN 12.

After receiving the NS-CHANGEROUTE message from the BSS 15, the SGSN 12 sends a NS-CHANGEROUTE-ACK PDU (at 546) to the BSS 15, using the source IP address of the NS-CHANGEROUTE message as the destination address, in this case $IP_{B3}$. The $NS^{IP}$ layer in the SGSN 12 notifies the corresponding load sharing task of the change-route request. The load sharing task recognizes the TLLI of the mobile station (MS A), and associates the source IP address ($IP_{B3}$) of the PDU with the mobile station (MS A). The new NS-VC is then selected (at 548) for the mobile station (MS A).

Explicit path negotiation for IP address replacement can also be performed in the event that an IP address is taken out of service, due to failure or an administrative action. The BSS 15 or SGSN 12 may issue an NS-CHANGEROUTE message to the other node to indicate that all mobile stations served by the one address is now to be served on a different address (that has already been commissioned by the IP address addition procedures, discussed above). In this case, the NS-CHANGEROUTE message contains the IP addresses involved rather than a TLLI of a single mobile station. Such an NS-CHANGEROUTE message is referred to as a "bulk" change-route message.

Figure 15:
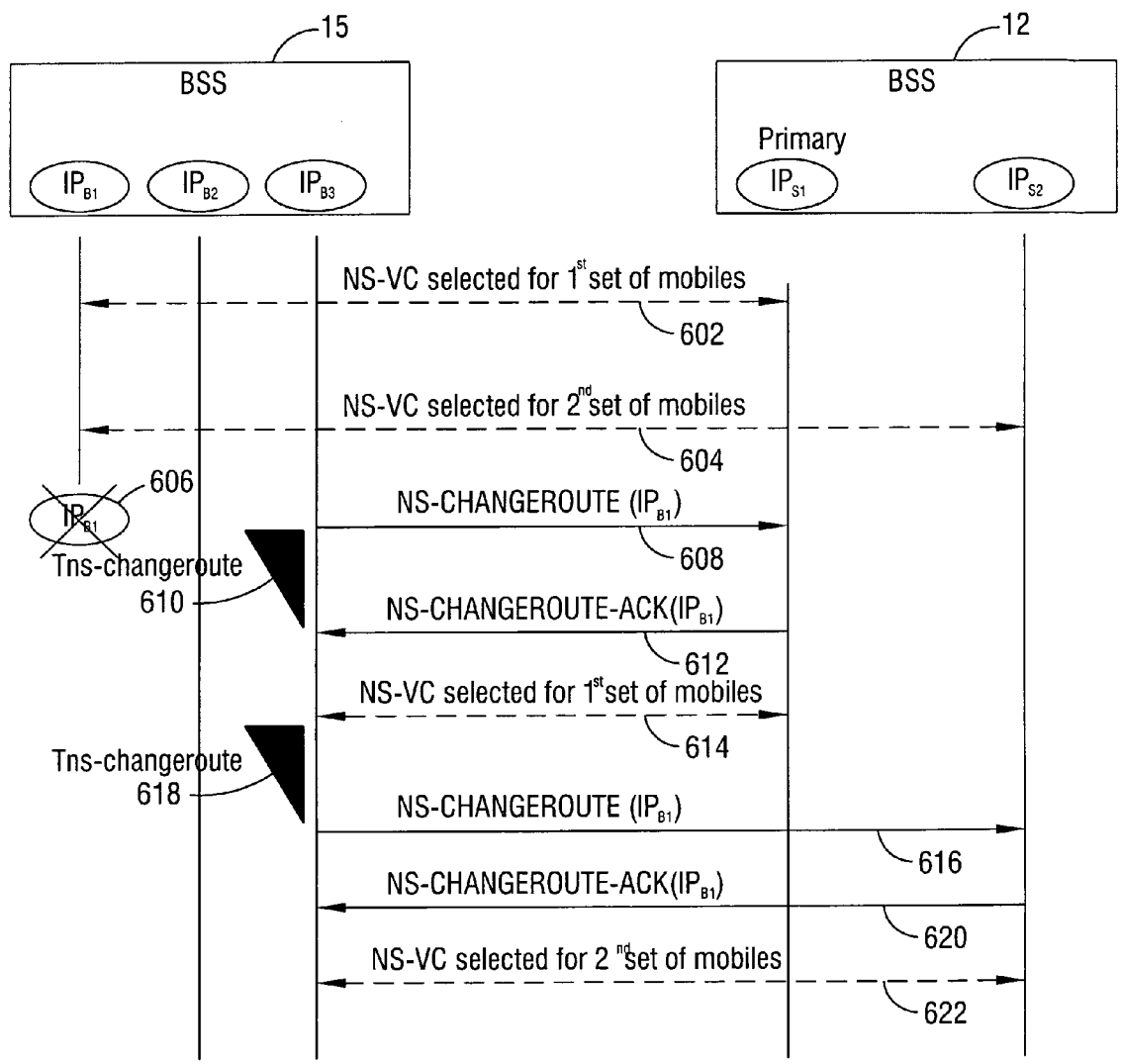
FIG. 15 is a message flow diagram illustrating a bulk explicit path negotiation procedure for IP address replacement.

FIG. 15 illustrates the message flow for effecting the explicit path negotiation for IP address replacement. In the illustrated example, two NS-VCs are selected (at 602 and 604) for a first set and a second set of mobile stations. The first NS-VC is ($IP_{B1}$, $IP_{S1}$), and the second NS-VC is ($IP_{B1}$, $IP_{S2}$). If the BSS address $IP_{B1}$ is taken out of service, as indicated by 606, which may occur due to failure or an administrative action, the load sharing task in the BSS 15 selects an alternate address, in this example $IP_{B3}$, to serve the mobile stations previously served by $IP_{B1}$. The load sharing task notifies the $NS^{IP}$ layer in the BSS 15 of this, with the $NS^{IP}$ layer responding by sending (at 608) an NS-CHANGEROUTE message to the SGSN 12 at address $IP_{S1}$. The NS-CHANGEROUTE message contains the address $IP_{B1}$ that has been taken out of service. The timer Tns-changeroute is also started (at 610) to wait for an acknowledge from the SGSN 12. When $NS^{IP}$ layer in the SGSN 12 successfully receives the NS-CHANGEROUTE message, the SGSN 12 responds (at 612) with the NS-CHANGEROUTE-ACK message, which is sent to the destination address $IP_{B3}$ in the BSS 15. The NS-CHANGEROUTE-ACK message contains the out-of-service address $IP_{B1}$. When the $NS^{IP}$ layer notifies the load sharing task in the SGSN 12 of the route change, the load sharing task selects a replacement NS-VC (at 614) for the first set of mobiles.

Next, the $NS^{IP}$ layer in the BSS sends (at 616) an NS-CHANGEROUTE message to the next SGSN address $IP_{S2}$ to indicate that $IP_{B1}$ has been taken out of service. A timer Tns-changeroute is started (at 618) to wait for an acknowledge. The SGSN 12 responds (at 620) with an NS-CHANGEROUTE-ACK message to the BSS 15. A replacement NS-VC is thus selected (at 622) for the second set of mobile stations.

Referring to FIGS. 16A–16B, one example of the NS-CHANGEROUTE and NS-CHANGEROUTE-ACK messages are shown. The NS-CHANGEROUTE message 670 includes a PDU Type information element 672 (to identify the message as an NS-CHANGEROUTE message), a TLLI information element 674 (to identify a mobile station for which a path is to be changed), and an IP address information element 676 (to identify the local IP address that has become unavailable so that a bulk change-route request can be performed). The NS-CHANGEROUTE-ACK message 680 also has a PDU Type field 682 (to identify the message as an NS-CHANGEROUTE-ACK message), a TLLI field 684 (which is the same as the TLLI field in the NS-CHANGEROUTE message 670), and an IP address field 686 (which is the same as the IP address field in the NS-CHANGEROUTE message 670).

To enable load sharing over the $Gb^{IP}$ interface, an additional parameter is included in the parameters exchanged between the EBSSGP layer and the $NS^{IP}$ layer. The additional parameter is not present for the conventional BSSGP and NS layers. In one embodiment, the use of the link selector parameter (LSP) is modified. The LSP currently defined in GSM 08.16 is referred to as the egress or local LSP. Conventionally, the LSP as defined in GSM 08.16, along with other parameters, are used by a load sharing task to select one of plural NS-VCs. In addition, according to some embodiments of the invention, an ingress or remote LSP is created to correspond to each IP address at the peer NSE. The remote LSP is used to identify the IP address of the peer NSE for a given mobile station, while the local LSP is used to identify the local IP address.

Figure 17:
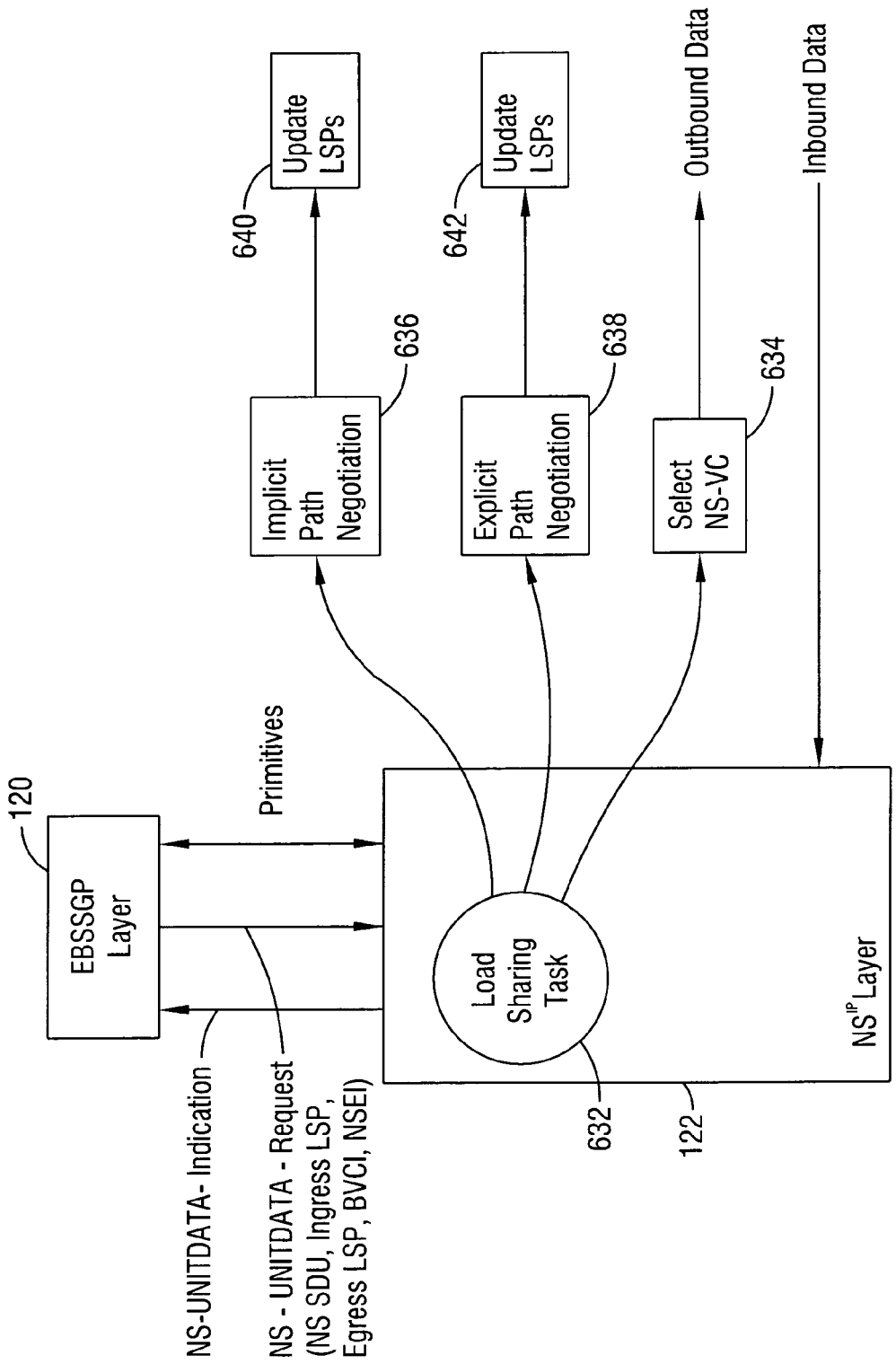
FIG. 17 is a block diagram of operations performed by a load sharing task.

Referring to FIG. 17, primitives are exchanged between the EBSSGP layer 120 and the $NS^{IP}$ layer 122. The primitives include NS-UNITDATA (to carry user traffic in NS SDUs), NS-CONGESTION (to report congestion), and NS-STATUS (to report availability or unavailability of NS-VCs). There are two types of NS-UNITDATA primitives: NS-UNITDATA-Request and NS-UNITDATA-Indication. The NS-UNITDATA-Request primitive is used by an NS user entity (in the EBSSGP layer 120) to send an NS SDU to a peer entity, while the NS-UNITDATA-Indication primitive is used by an NS entity (in the $NS^{IP}$ layer 122) to provide an NS SDU received on a virtual connection to the NS user entity (in the EBSSGP layer 120). The NS-UNITDATA-Indication primitive includes an ingress or remote LSP that corresponds to the source IP address of the incoming NS SDU. The ingress or remote LSP is then included in subsequent NS-UNITDATA-Request primitives. If the EBSSGP layer 120 has not yet received an NS-UNITDATA-Indication primitive, then the ingress or remote LSP in the NS-UNITDATA-Request primitive is set to a null value. The ingress and egress LSPs are used together to determine the destination IP address for outbound traffic for a given mobile station. If the ingress LSP is a null value, then the selected destination address is the primary address of the peer node.

A load sharing task 632 in the $Gb^{IP}$ interface distributes the NS SDU traffic among NS-VCs of an NS-VC group. The $Gb^{IP}$ load sharing task 632 also provides a mechanism of reorganizing NS-SDU traffic on the $Gb^{IP}$ interface in case of failure or processor overload, as discussed above.

The NS-UNITDATA-Request primitive includes the following elements: an NS SDU to be transmitted over the $Gb^{IP}$ interface; the ingress or remote LSP; the egress or local LSP; the BVCI; and the NSEI. The load sharing task 632 (or another module in the $NS^{IP}$ layer) selects an NS-VC (at 634) based on these parameters. The egress or local LSP and BVCI are used to select the local NS-VL, while the ingress or remote LSP is used to select the remote NS-VL. For each BVCI and NSEI, the load sharing task 632 selects, based on the egress or local LSP, the local IP address from those commissioned for the NSE. The load sharing task 632 selects the remote NS-VL corresponding to the ingress or remote LSP. If the ingress or remote LSP is set to a null value, then the primary IP address of the peer NSE is used for the remote NS-VL. For each BVCI and NSEI, NS SDUs with the same LSP values are sent to the same NS-VC.

When inbound data (NS SDUs) are received, they are passed to the load sharing task 632. The load sharing task 632 then assigns an ingress or remote LSP before passing the NS SDU to the NS user entity (in the EBSSGP layer 120) in the NS-UNITDATA-Indication primitive.

As discussed above, the addresses used to communicate mobile user traffic can be changed. This may be changed by implicit path negotiation, performed at 636, or by explicit path negotiation, performed at 638. Whether implicit path negotiation or explicit path negotiation is performed is based on whether data flow is unidirectional or bi-directional. A mobile station may indicate that its session involves unidirectional data flow by sending a predetermined message, such as an NS-MOBILE-ACTIVITY-Request message. The same message may also be used to indicate some amount of time has elapsed since data has been received on an uplink or downlink path. If the data flow is unidirectional or it has been a relatively long time since data flow has occurred in one direction, explicit path negotiation is employed by the load sharing task 632. The NS-MOBILE-ACTIVITY-Request message contains the TLLI of the affected mobile station, with the TLLI used in the NS-CHANGEROUTE message to effect explicit path negotiation.

A change in IP addresses results in a reorganization of the NS SDU traffic among the remaining available IP addresses at the affected node. For each mobile station, the sender may continue to send NS-SDUs to the negotiated remote IP address, or the load sharing task 632 may redirect subsequent NS SDUs to the receiver's primary IP address, thereby initiating re-negotiation of the path for the mobile traffic. When paths are re-negotiated, the LSPs are updated (at 640 and at 642). The updates are performed by the load sharing task sending an update message to the NS user entity in the EBSSGP layer 120.

The above example assumes a single default UDP port with multiple IP addresses. Similar association of remote LSP and local LSP values with local and remote UDP ports may also be performed if plural UDP ports are commissioned in one or both of the BSS and SGSN.

Figure 18:
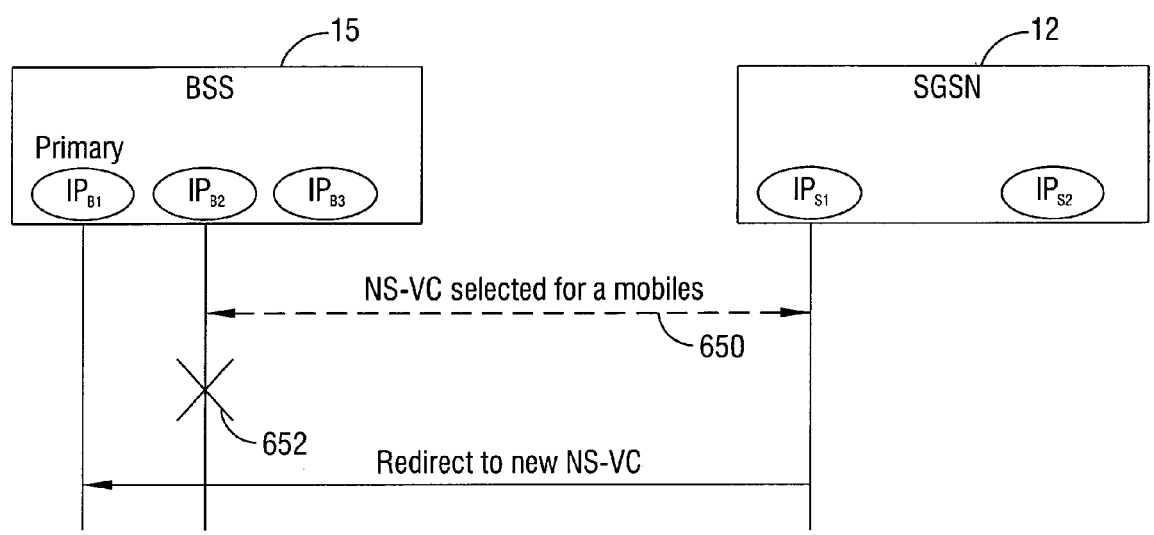
FIG. 18 is a message flow diagram illustrating recovery of a downlink path.

Referring to FIG. 18, recovery of a downlink path between the SGSN 12 and the BSS 15 in case of an IP address being disabled is illustrated. An NS-VC ($IP_{B2}$, $IP_{S1}$) is established (at 650) for a set of mobile stations. Then, for some reason, the IP address $IP_{B2}$ in the BSS 15 is disabled. This can be communicated by one of various mechanisms, including the NS-CHANGEROUTE message discussed above. When the SGSN 12 detects that the IP address $IP_{B2}$ in the BSS 15 has been disabled, it identifies the primary address (e.g., $IP_{B1}$) of the BSS 15 and redirects (at 654) subsequent user traffic to the new NS-VC defined by ($IP_{B1}$, $IP_{S1}$). When the BSS 15 receives user traffic at its primary address, it may initiate re-negotiation for a new path.

The recovery of an uplink path between the BSS 15 and the SGSN 12 can be performed in similar fashion.

Figure 19:
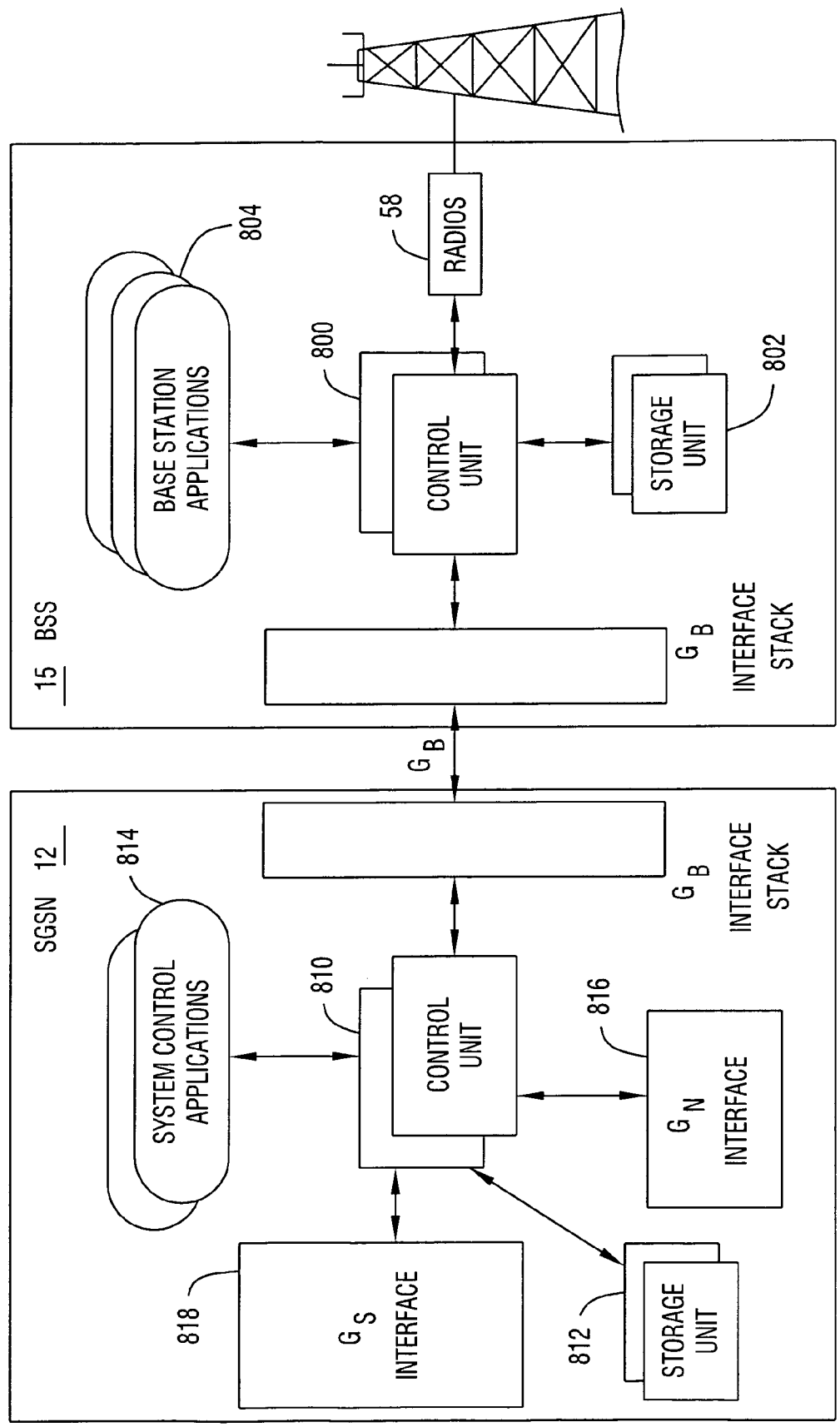
FIG. 19 is a block diagram of components in a BSS and an SGSN, in accordance with one example arrangement.

The operations, tasks, and functions discussed herein that are performed in nodes or systems in the mobile communications network 10 may be controlled by software applications, routines, or modules executable on control units. For example, referring to FIG. 19, the BSS 15 includes one or more control units 800 and storage units 802. The BSS 15 also runs base station applications, routines, or modules 804 that are stored in one or more storage units 802. The Gb interface layers (and tasks or modules in those layers) which are implemented in software can also be executable on the control unit(s) 800. Generally, a communications module (including the Gb interface stack in the illustrated example) enables communications between the BSS 15 and the SGSN 12 over an interface that implements packet-switched, connectionless communications. A communications module is similarly included in the SGSN 12 (which includes the Gb interface stack in FIG. 19).

The SGSN 12 includes one or more control units 810 and one or more storage units 812. System control applications, routines, or modules 814 (as well as layers or modules in the Gb interface) are executable on the control units 810. The SGSN 12 also contains a Gn interface 816 capable of communicating with the GGSN 18 (FIG. 1). A Gs interface 818 is capable of communicating with the G-MSC 22 (FIG. 1).

Each control unit includes a microprocessor, microcontroller, processor card (including one or more microprocessors or microcontrollers), or another control or computing device. As used here, a "controller" or a "control module" refers to hardware, software, or a combination thereof. A "controller" or "control module" can refer to a single component or to multiple components (whether software or hardware).

The storage units include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or modules in a node and stored in a respective storage unit when executed by a control unit cause the corresponding node to perform programmed acts.

The instructions of the software routines or modules are loaded or transported into the node in one of many different ways. For example, code segments including instructions stored on floppy disks, CD or DVD media, a hard disk, or transported through a network interface card, modem, or other interface device are loaded into the node and executed as corresponding software routines or modules. In the loading or transport process, data signals that are embodied in carrier waves (transmitted over telephone lines, network lines, wireless links, cables, and the like) communicate the code segments, including instructions, to the node. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of establishing communications between a base station and a system controller over a network, comprising:
   identifying a plurality of paths in the network, each path defined by an address in the base station and an address in the system controller; and
   selecting one of the plurality of paths to communicate data associated with a given mobile station,
   wherein selecting one of the plurality of paths comprises performing an implicit negotiation in which the path is defined by a source Internet Protocol (IP) address of a message communicated by the base station and by a source IP address of a message communicated by the system controller.

2. The method of claim 1, wherein performing the implicit negotiation comprises sending and receiving messages in a session having bi-directional data flow.

3. The method of claim 1, further comprising selecting another path by sending a message from another source address.

4. The method of claim 3, wherein sending the message comprises sending a UNITDATA message.

5. The method of claim 1, further comprising selecting another path by sending a change-route request.

6. The method of claim 5, wherein sending the change-route request comprises sending a General Packet Radio Service NS-CHANGEROUTE request.

7. The method of claim 5, wherein selecting another path by sending the change-route request is part of an explicit path negotiation.

8. The method of claim 5, wherein sending the change-route request comprises sending a request containing an identifier of a mobile station.

9. The method of claim 8, wherein the identifier comprises a General Packet Radio Service temporary logical link identifier.

10. The method of claim 1, further comprising:
    disabling an address; and
    sending a change-route request containing the disabled address to change a path for each mobile station assigned a path defined by the disabled address.

11. A method of establishing communications between a base station and a system controller over a network, comprising:
    identifying a plurality of paths in the network, each path defined by an address in the base station and an address in the system controller; and selecting one of the plurality of paths to communicate data associated with a given mobile station, wherein selecting one of the plurality of paths comprises performing an implicit negotiation in which the path is defined by a source address of a message communicated by the base station and by a source address of a message communicated by the system controller, wherein the network is a packet-switched, connectionless network, and wherein selecting one of the plurality of paths comprises selecting one of a plurality of virtual connections on the packet-switched, connectionless network, each virtual connection based on a base station address and a system controller address.

12. A method of establishing communications between a base station and a system controller over a network, comprising:

identifying a plurality of paths in the network, each path defined by an Internet Protocol (IP) address in the base station and an IP address in the system controller;

selecting one of the plurality of paths to communicate data associated with a given mobile station; and selecting another path by sending a change-route request, wherein selecting another path by sending a change-route request is performed during a session having unidirectional data flow between the base station and the system controller.

13. A method of establishing communications between a base station and a system controller over a network, comprising:

identifying a plurality of paths in the network, each path defined by an Internet Protocol (IP) address in the base station and an IP address in the system controller;

selecting one of the plurality of paths to communicate data associated with a given mobile station; and selecting another path by sending a change-route request, wherein sending the change-route request comprises sending the change-route request using a new source IP address, and wherein selecting the other path is based on the new source IP address.

14. A first system for use in a mobile communications network, comprising:

a communications module adapted to communicate over a packet-switched network coupled to a second system, the first system being one of a base station and a system controller and the second system being another one of the base station and the system controller;

a storage element containing one or more first addresses associated with the first system; and a control module adapted to select one of plural paths over the packet-switched network, each path defined by one address associated with the first system and one address associated with the second system, the control module adapted to select one of plural paths over the packet-switched network by performing an implicit negotiation in which a path is defined by a source address of a message communicated by the first system and by a source address of a message communicated by the second system.

15. The first system of claim 14, wherein the communications module is adapted to communicate over a Gb interface provided in the packet-switched network, wherein the plural paths are Internet Protocol (IP)-based virtual circuits of the Gb interface, each IP-based virtual circuit identified by a unique combination of an IP address associated with the first system and an IP address associated with the second system.

16. The first system of claim 14, comprising the base station.

17. The first system of claim 14, comprising the system controller, the system controller comprising a serving GPRS support node.

18. The first system of claim 14, wherein each address comprises an Internet Protocol address, and the control module is adapted to detect out-of-order delivery of Internet Protocol packets in one of the paths over the packet-switched network between the base station and the system controller.

19. The first system of claim 14, wherein each path is further defined by a User Datagram Protocol port of the first system and a User Datagram Protocol port of the second system.

20. The first system of claim 14, wherein the control module comprises a load sharing task to select different paths for different mobile stations.

21. The first system of claim 14, further comprising a GPRS Network Service layer, the Network Service layer comprising the control module.

22. The first system of claim 21, further comprising an upper layer, the Network Service layer exchanging primitives with the upper layer.

23. A first system for use in a mobile communications network, comprising:

a communications module adapted to communicate over a packet-switched network coupled to a second system, the first system being one of a base station and a system controller and the second system being another one of the base station and the system controller;

a storage element containing one or more first addresses associated with the first system;

a control module adapted to select one of plural paths over the packet-switched network, each path defined by one address associated with the first system and one address associated with the second system;

a GPRS Network Service layer, the Network Service layer comprising the control module; and an upper layer, the Network Service layer exchanging primitives with the upper layer, wherein the primitives comprise an NS-UNITDATA-Request primitive carrying outbound data and an NS-UNITDATA-Indication primitive carrying inbound data, the NS-UNITDATA-Indication primitive containing a remote link selector parameter, and the NS-UNITDATA-Request primitive containing the remote link selector parameter and a local link selector parameter.

24. The first system of claim 23, wherein the control module is adapted to select an address associated with the first system based on the local link selector parameter.

25. The first system of claim 23, wherein the control module is adapted to select an address associated with the second system based on the remote link selector parameter.

26. An article comprising at least one storage medium containing instructions for establishing communications over a network between a base station and a system controller, the instructions when executed causing a first node to:

identify a plurality of paths in the network, each path defined by an Internet Protocol (IP) address in the base station and an IP address in the system controller, the first node being one of the base station and system controller;

select one of the plurality of paths to communicate data associated with a given mobile station; and send a message to decommission an IP address of one of the base station and system controller.

27. The article of claim 26, wherein the instructions when executed cause the first node to further select another path by sending a message from another source address.

28. The article of claim 26, wherein the instructions when executed cause the first node to further select another path for each mobile station assigned a path defined by the decommissioned address by sending a change-route request containing a different IP address.

29. The article of claim 28, wherein the instructions when executed cause the first node to send the change-route request containing an identifier of a mobile station.

30. An article comprising at least one storage medium containing instructions for establishing communications over a network between a base station and a system controller, the instructions when executed causing a first node to:

identify a plurality of paths in the network, each path defined by an address in the base station and an address in the system controller, the first node being one of the base station and system controller; and select one of the plurality of paths to communicate data associated with a given mobile station, wherein selecting one of the plurality of paths comprises performing an implicit negotiation in which the path is defined by a source address of a message communicated by the base station and by a source address of a message communicated by the system controller, wherein the network is a packet-switched, connectionless network, and wherein the instructions when executed cause the first node to select one of the plurality of paths by selecting one of a plurality of virtual connections on the packet-switched, connectionless network, each virtual connection based on a base station address and a system controller address.

31. An article comprising at least one storage medium containing instructions for establishing communications over a network between a base station and a system controller, the instructions when executed causing a first node to:

identify a plurality of paths in the network, each path defined by an Internet Protocol (IP) address in the base station and an IP address in the system controller, the first node being one of the base station and system controller;

select one of the plurality of paths to communicate data associated with a given mobile station; and select another path by sending a change-route request, wherein the change-route request contains an identifier of a mobile station, wherein the instructions when executed cause the first node to send the change-route request using a new source IP address, and to select the other path based on the new source IP address.

* * * * *